United States Patent
Li et al.

(10) Patent No.: US 11,990,977 B1
(45) Date of Patent: May 21, 2024

(54) BEAM TRAINING METHOD AND APPARATUS

(71) Applicant: HUAWEI TECHNOLOGIES CO., LTD., GuangDong (CN)

(72) Inventors: Tie Li, Beijing (CN); Yongping Zhang, Beijing (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 17/960,939

(22) Filed: Oct. 6, 2022

Related U.S. Application Data

(63) Continuation of application No. PCT/CN2021/086183, filed on Apr. 9, 2021.

Foreign Application Priority Data

Apr. 10, 2020 (CN) .......................... 202010280876.1

(51) Int. Cl.
  *H04B 7/08* (2006.01)
  *H04B 7/06* (2006.01)
  *H04L 5/00* (2006.01)

(52) U.S. Cl.
  CPC ........... *H04B 7/086* (2013.01); *H04B 7/0617* (2013.01); *H04L 5/0048* (2013.01)

(58) Field of Classification Search
  CPC ...... H04B 7/086; H04B 7/0617; H04L 5/0048
  See application file for complete search history.

(56) References Cited

U.S. PATENT DOCUMENTS

| | | | | |
|---|---|---|---|---|
| 2020/0154450 | A1* | 5/2020 | Zhou | H04L 5/0053 |
| 2020/0287637 | A1* | 9/2020 | Zhang | H04B 7/088 |

FOREIGN PATENT DOCUMENTS

| | | |
|---|---|---|
| CN | 107888243 A | 4/2018 |
| CN | 109391311 A | 2/2019 |
| CN | 110299978 A | 10/2019 |
| CN | 110603747 A | 12/2019 |
| WO | 2018017163 A1 | 1/2018 |
| WO | 2019028765 A1 | 2/2019 |

(Continued)

OTHER PUBLICATIONS

R1-1717424, Zte et al., Discussion on beam management, 3GPP TSG RAN WG1 Meeting #90-bis, Prague, Czechia, Oct. 9-13, 2017, 12 pages.

(Continued)

*Primary Examiner* — Sung S Ahn
(74) *Attorney, Agent, or Firm* — Rimon PC

(57) ABSTRACT

Embodiments of this application provide a beam training method and an apparatus, to improve beam training performance. The method includes: The first apparatus determines a quasi co-location assumption of a first reference signal, and receives, based on the quasi co-location assumption of the first reference signal, the first reference signal sent by a second apparatus. The quasi co-location assumption meets at least either of the following conditions: A plurality of periodic instances of the first reference signal at an interval of N periodicities have a same quasi co-location assumption, where N is an integer greater than 0; and first reference signals that have different indexes and that are in a same resource set have different quasi co-location assumptions.

20 Claims, 11 Drawing Sheets

(56) References Cited

FOREIGN PATENT DOCUMENTS

WO     2019047945 A1     3/2019
WO     2020062150 A1     4/2020

OTHER PUBLICATIONS

R4-1908827, MediaTek Inc., Discussion on QCL relation in requirements, 3GPP TSG-RAN WG4 Meeting #92, Ljubljana, Slovenia, Aug. 26-30, 2019, 3 pages.
3GPP TS 38.133 V16.3.0 (Mar. 2020), 3rd Generation Partnership Project;Technical Specification Group Radio Access Network;NR-;Requirements for support of radio resource management(Release 16), 1170 pages.
R4-2000935, MediaTek Inc., Discussion on RRM requirements for L1-SINR, 3GPP TSG-RAN WG4 Meeting #94, E-meeting, Feb. 24-Mar. 6, 2020, 5 pages.
3GPP TS 38.211 V16.1.0 (Mar. 2020), 3rd Generation Partnership Project;Technical Specification Group Radio Access Network;NR;Physical channels and modulation(Release 16), 130 pages.
3GPP TS 38.214 V16.1.0 (Mar. 2020), 3rd Generation Partnership Project;Technical Specification Group Radio Access Network;NR;Physical layer procedures for data(Release 16), 151 pages.

\* cited by examiner

BEAM TRAINING METHOD AND APPARATUS

CROSS-REFERENCE TO RELATED APPLICATIONS

This application is a continuation of International Application No. PCT/CN2021/086183, filed on Apr. 9, 2021, which claims priority to Chinese Patent Application No. 202010280876.1, filed on Apr. 10, 2020. The disclosures of the aforementioned applications are hereby incorporated by reference in their entireties.

TECHNICAL FIELD

This application relates to the field of communication technologies, and in particular, to a beam training method and an apparatus.

BACKGROUND

A 3rd Generation Partnership Project (3GPP) incorporates millimeter wave bands with abundant spectrum resources into a 5th generation (5G) cellular communication system standard, to meet a user requirement for high-rate communication. However, millimeter wave signals experience severe path loss during propagation due to their high frequency and a short wavelength. To overcome the severe attenuation of the received signal strength caused by the path loss, an effective method is to use beamforming to improve the directivity of signal sending and receiving. Due to a limited beam coverage, transmit and receive beams need to be effectively paired to meet a link budget required for communication. Therefore, user equipment (UE) and a network device (NE) need to perform beam training to select an optimal beam pair from a UE side and a network side, so that the UE and the NE can communicate by using the beam pair. Downlink is used as an example. A beam training process is as follows: A base station (g Node B, gNB) sends a reference signal to the UE in a beam sweeping manner, the UE receives, in the beam sweeping manner, the reference signal sent by the gNB, and the UE determines a receive beam and a transmit beam by measuring the signal strength of a reference signal sent on each transmit beam. Similarly, an uplink beam training process is as follows: The gNB receives, in the beam sweeping manner, a reference signal sent by the UE, the UE sends the reference signal in the beam sweeping manner, and the base station determines a receive beam and a transmit beam by measuring the signal strength of a reference signal sent on each transmit beam.

Currently, the 3GPP protocol is unclear about behaviors of both the base station and the UE in the beam training process. As a result, beam training performance is poor. For example, when behaviors of the base station and the terminal are not aligned, beam training cannot be completed. For another example, inappropriate behaviors of the base station and the terminal lead to poor beam training performance and a large system delay.

SUMMARY

Embodiments of this application provide a beam training method, an apparatus, a chip, a computer-readable storage medium, a computer program product, and the like, to improve beam training performance.

According to a first aspect, an embodiment of this application provides beam training. The method may be applied to a first apparatus. The first apparatus may be a communication device, or a chip or a chip set in the communication device. The communication device may be a terminal device, or may be a network device. The method includes: The first apparatus determines a quasi co-location (QCL) assumption of a first reference signal, and receives, based on the QCL assumption of the first reference signal, the first reference signal sent by a second apparatus. The QCL assumption meets at least either of the following conditions: A plurality of periodic instances of the first reference signal at an interval of N periodicities have a same QCL assumption, where N is an integer greater than 0; and first reference signals that have different indexes and that are in a same resource set have different QCL assumptions.

In this embodiment of this application, beam sweeping behaviors of a base station and a terminal can be performed by using the QCL assumption of the first reference signal, so that the beam sweeping behaviors of the base station and the terminal can be aligned. This can enhance a speed and accuracy of beam training, and further improve beam training performance.

In a possible design, the QCL assumption meets: A plurality of periodic instances of the first reference signal at an interval of N periodicities have a same QCL assumption. That the first apparatus receives, based on the QCL assumption of the first reference signal, the first reference signal sent by a second apparatus includes: The first apparatus receives the plurality of periodic instances by using a same receive beam or different receive beams. In the foregoing design, a receive beam may be directly constrained by defining a QCL assumption. Alternatively, a transmit beam may be directly constrained by defining a QCL assumption, to indirectly constrain a receive beam, so that a beam sweeping behavior of the first apparatus can be clarified.

In a possible design, that the first apparatus receives the plurality of periodic instances by using a same receive beam or different receive beams includes: If a repetition parameter of a resource set in which the first reference signal is located is configured to be an off state (OFF), the first apparatus receives the plurality of periodic instances by using the same receive beam. In the foregoing design, the receive beam may be further constrained by using the QCL assumption and the repetition. Alternatively, the transmit beam may be further constrained by using the QCL assumption and the repetition, to indirectly constrain the receive beam, so that a beam sweeping behavior of the first apparatus can be clearer.

In a possible design, that the first apparatus receives the plurality of periodic instances by using a same receive beam or different receive beams includes: If a repetition parameter of a resource set in which the first reference signal is located is configured to be OFF, the first apparatus receives the plurality of periodic instances by using different receive beams. In the foregoing design, the receive beam may be further constrained by using the QCL assumption and the repetition. Alternatively, the transmit beam may be further constrained by using the QCL assumption and the repetition, to indirectly constrain the receive beam, so that a beam sweeping behavior of the first apparatus can be clearer.

In a possible design, that the first apparatus receives the plurality of periodic instances by using a same receive beam or different receive beams includes: If a repetition parameter of a resource set in which the first reference signal is located is configured to be an on state (ON), the first apparatus receives the plurality of periodic instances by using the different receive beams. In the foregoing design, the receive beam may be further constrained by using the QCL assumption and the repetition. Alternatively, the transmit beam may be further constrained by using the QCL assumption and the repetition, to indirectly constrain the receive beam, so that a beam sweeping behavior of the first apparatus can be clearer.

In a possible design, that the first apparatus receives the plurality of periodic instances by using a same receive beam or different receive beams includes: If a repetition parameter of a resource set in which the first reference signal is located is configured to be ON, the first apparatus receives the plurality of periodic instances by using the same receive beam. In the foregoing design, the receive beam may be further constrained by using the QCL assumption and the repetition. Alternatively, the transmit beam may be further constrained by using the QCL assumption and the repetition, to indirectly constrain the receive beam, so that a beam sweeping behavior of the first apparatus can be clearer.

In a possible design, if the QCL assumption meets that first reference signals that have different indexes and that are in a same resource set have different QCL assumptions, that the first apparatus receives, based on the QCL assumption of the first reference signal, the first reference signal sent by a second apparatus includes: The first apparatus receives first reference signals that have different indexes and that are in a same resource set by using a same receive beam or different receive beams. In the foregoing design, a receive beam may be directly constrained by defining a QCL assumption. Alternatively, a transmit beam may be directly constrained by defining a QCL assumption, to indirectly constrain a receive beam, so that a beam sweeping behavior of the first apparatus can be clarified.

In a possible design, N is a quantity of transmit beams of the second apparatus, or N is determined based on a quantity of transmit beams of the second apparatus and a quantity of first reference signals, or N is a quantity of receive beams of the first apparatus, or N is determined based on a quantity of receive beams of the first apparatus and a quantity of first reference signals.

In a possible design, that the first apparatus determines a quasi co-location QCL assumption of a first reference signal includes: If the QCL assumption is not configured for the first reference signal, the first apparatus uses a QCL assumption of a second reference signal associated with the first reference signal as the QCL assumption of the first reference signal. In the foregoing design, the first apparatus receives the first reference signal by using the QCL assumption of the second reference signal, so that a beam sweeping behavior of receiving the second reference signal and the first reference signal by the base station can be determined, to enhance beam training performance.

In a possible design, if no QCL assumption is configured for the second reference signal associated with the first reference signal, the first apparatus receives the second reference signal based on the QCL assumption of the first reference signal. In the foregoing design, the first apparatus receives the second reference signal by using the QCL assumption of the first reference signal, so that a beam sweeping behavior of receiving the second reference signal and the first reference signal by the first apparatus can be determined, to enhance beam training performance.

In a possible design, the first reference signal is a channel measurement resource (CMR), and the second reference signal is an interference measurement resource (IMR).

In a possible design, the first reference signal is an IMR, and the second reference signal is a CMR.

In a possible design, no QCL assumption is configured for the first reference signal. According to the foregoing design, the first apparatus may implement the beam training method provided in this application when no QCL assumption is configured for the first reference signal.

According to a second aspect, an embodiment of this application provides beam training. The method may be applied to a second apparatus. The second apparatus may be a communication device, or a chip or a chip set in the communication device. The communication device may be a terminal device, or may be a network device. The method includes: The second apparatus determines a QCL assumption of a first reference signal, and sends, based on the QCL assumption of the first reference signal, the first reference signal to a first apparatus. The QCL assumption meets at least either of the following conditions: A plurality of periodic instances of the first reference signal at an interval of N periodicities have a same QCL assumption, where a periodic instance is the first reference signal sent in a periodicity and N is an integer greater than 0; and first reference signals that have different indexes and that are in a same resource set have different QCL assumptions.

In this embodiment of this application, beam sweeping behaviors of a base station and a terminal can be performed by using the QCL assumption of the first reference signal, so that the beam sweeping behaviors of the base station and the terminal can be aligned. This can enhance a speed and accuracy of beam training, and further improve beam training performance.

In a possible design, the QCL assumption meets: A plurality of periodic instances of the first reference signal at an interval of N periodicities have a same QCL assumption. Then that the second apparatus sends, based on the QCL assumption of the first reference signal, the first reference signal to a first apparatus includes: The second apparatus sends the plurality of periodic instances by using a same transmit beam or different transmit beams. In the foregoing design, a transmit beam may be directly constrained by defining a QCL assumption. Alternatively, a receive beam may be directly constrained by defining a QCL assumption, to indirectly constrain a transmit beam, so that a beam sweeping behavior of the second apparatus can be clarified.

In a possible design, that the second apparatus sends the plurality of periodic instances by using a same transmit beam or different transmit beams includes: if a repetition of a resource set in which the first reference signal is located is configured to be OFF, the second apparatus sends the plurality of periodic instances by using the same transmit beam. In the foregoing design, the transmit beam may be further constrained by using the QCL assumption and the repetition. Alternatively, the receive beam may be further constrained by using the QCL assumption and the repetition, to indirectly constrain the transmit beam, so that a beam sweeping behavior of the second apparatus can be clearer.

In a possible design, that the second apparatus sends the plurality of periodic instances by using a same transmit beam or different transmit beams includes: If repetition of a resource set in which the first reference signal is located is configured to be OFF, the second apparatus sends the plurality of periodic instances by using different transmit beams. In the foregoing design, the transmit beam may be further constrained by using the QCL assumption and the repetition. Alternatively, the receive beam may be further constrained by using the QCL assumption and the repetition, to indirectly constrain the transmit beam, so that a beam sweeping behavior of the second apparatus can be clearer.

In a possible design, that the second apparatus sends the plurality of periodic instances by using a same transmit beam or different transmit beams includes: If repetition of a resource set in which the first reference signal is located is configured to be ON, the second apparatus sends the plurality of periodic instances by using different transmit beams. In the foregoing design, the transmit beam may be further constrained by using the QCL assumption and the repetition. Alternatively, the receive beam may be further constrained by using the QCL assumption and the repetition, to indirectly constrain the transmit beam, so that a beam sweeping behavior of the second apparatus can be clearer.

In a possible design, that the second apparatus sends the plurality of periodic instances by using a same transmit beam or different transmit beams includes: if a repetition of a resource set in which the first reference signal is located is configured to be ON, the second apparatus sends the plurality of periodic instances by using the same transmit beam. In the foregoing design, the transmit beam may be further constrained by using the QCL assumption and the repetition. Alternatively, the receive beam may be further constrained by using the QCL assumption and the repetition, to indirectly constrain the transmit beam, so that a beam sweeping behavior of the second apparatus can be clearer.

In a possible design, if the QCL assumption meets that first reference signals that have different indexes and that are in a same resource set have different QCL assumptions, that the second apparatus sends, based on the QCL assumption of the first reference signal, the first reference signal to a first apparatus includes: The second apparatus sends first reference signals that have different indexes and that are in a same resource set by using a same receive beam or different transmit beams. In the foregoing design, a transmit beam may be directly constrained by defining a QCL assumption. Alternatively, a receive beam may be directly constrained by defining a QCL assumption, to indirectly constrain a transmit beam, so that a beam sweeping behavior of the second apparatus can be clarified.

In a possible design, N is a quantity of transmit beams of the second apparatus, or N is determined based on a quantity of transmit beams of the second apparatus and a quantity of first reference signals, or N is a quantity of receive beams of the first apparatus, or N is determined based on a quantity of receive beams of the first apparatus and a quantity of first reference signals.

In a possible design, that the second apparatus determines a QCL assumption of a first reference signal includes: If the QCL assumption is not configured for the first reference signal, the second apparatus uses a QCL assumption of a second reference signal associated with the first reference signal as the QCL assumption of the first reference signal. In the foregoing design, the second apparatus sends the second reference signal by using the QCL assumption of the first reference signal, so that a beam sweeping behavior of sending and receiving the second reference signal and the first reference signal by the second apparatus can be determined, to enhance beam training performance.

In a possible design, if no QCL assumption is configured for the second reference signal associated with the first reference signal, the second apparatus sends the second reference signal based on the QCL assumption of the first reference signal.

In a possible design, the first reference signal is a CMR, and the second reference signal is an IMR.

In a possible design, the first reference signal is an IMR, and the second reference signal is a CMR.

In a possible design, no QCL assumption is configured for the first reference signal. According to the foregoing design, the second apparatus may implement the beam training method provided in this application when no QCL assumption is configured for the first reference signal.

According to a third aspect, this application provides a beam training apparatus. The apparatus may be a communication device, or may be a chip or a chip set in the communication device. The communication device may be a terminal device or may be a base station. The apparatus may include a processing module and a transceiver module. When the apparatus is a communication device, the processing module may be a processor, and the transceiver module may be a transceiver. The apparatus may further include a storage module. The storage module may be a memory. The storage module is configured to store instructions. The processing module executes the instructions stored in the storage module, to perform corresponding functions in the first aspect or the second aspect. When the apparatus is the chip or the chip set in the communication device, the processing module may be a processor, a processing circuit, a logic circuit, or the like. The transceiver module may be an input/output interface, a pin, a circuit, or the like. The processing module executes the instructions stored in the storage module, to perform corresponding functions in the first aspect or in the second aspect. The storage module may be a storage module (for example, a register or a cache) in the chip or the chip set, or may be a storage module (for example, a read-only memory or a random access memory) that is in the base station and that is located outside the chip or the chip set.

According to a fourth aspect, a beam training apparatus is provided, including a processor. Optionally, the apparatus may further include a communication interface. Optionally, the apparatus may further include a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the method in any one of the first aspect, any design of the first aspect, the second aspect, or any design of the second aspect.

According to a fifth aspect, an embodiment of this application provides a computer storage medium. The computer storage medium stores a program instruction, and when the program instruction is run on a communication device, the communication device is enabled to perform the method according to any one of the first aspect or the possible designs of the first aspect or any one of the second aspect or the possible designs of the second aspect in embodiments of this application.

According to a sixth aspect, an embodiment of this application provides a computer program product. When the computer program product is run on a communication device, the communication device is enabled to perform the method according to any one of the first aspect or the possible designs of the first aspect or any one of the second aspect or the possible designs of the second aspect in embodiments of this application.

According to a seventh aspect, an embodiment of this application provides a chip. The chip is coupled to a memory, to perform the method according to any one of the first aspect or the possible designs of the first aspect or any one of the second aspect or the possible designs of the second aspect in embodiments of this application.

According to an eighth aspect, an embodiment of this application provides a chip, including a communication interface and at least one processor. The processor runs to perform the method according to any one of the first aspect or the possible designs of the first aspect or any one of the second aspect or the possible designs of the second aspect in embodiments of this application.

It should be noted that "coupling" in embodiments of this application indicates a direct combination or an indirect combination of two components.

DESCRIPTION OF EMBODIMENTS

Figure 1:
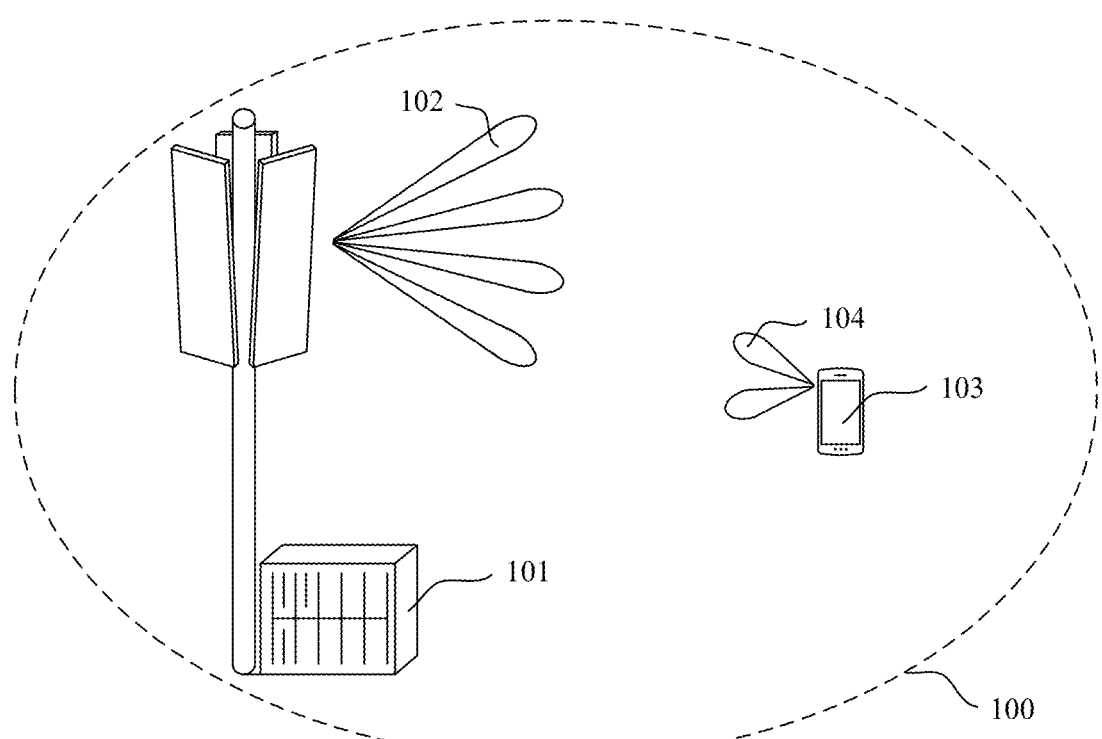
FIG. 1 is a schematic diagram of an architecture of a communication system according to an embodiment of this application.

To facilitate understanding of embodiments of this application, the following describes terms related to embodiments of this application.

1. Beam:

The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having a same communication feature or similar communication features may be considered as one beam. One beam may include one or more antenna ports (in other words, one beam may be formed by one or more antenna ports), configured to transmit a data channel, a control channel, a sounding signal, and the like. For example, a transmit beam may be a distribution of signal strength, in different directions in space, of a signal transmitted through an antenna, and a receive beam may be a distribution of signal strength, in different directions in space, of a radio signal received from an antenna. It may be understood that, one or more antenna ports forming one beam may also be considered as one antenna port set.

Beams may be classified into a transmit beam and a receive beam of a network device, and a transmit beam and a receive beam of a terminal device. The transmit beam of the network device is used to describe transmit-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information of the terminal device. In other words, the beam is used to describe beamforming information.

The beam may correspond to one or more of a time resource, a space resource, and a frequency-domain resource.

Optionally, the beam may further correspond to a reference signal (RS) resource (for example, a beamforming RS resource) or beamforming information.

Optionally, the beam may further correspond to information associated with an RS resource. An RS may be a channel state information-reference signal (CSI-RS), a synchronization signal broadcast channel block (synchronous signal/PBCH block, SS/PBCH block), which may also be referred to as an SSB, a demodulation reference signal (DMRS), a phase tracking reference signal (PTRS), a tracking reference signal (TRS), a sounding reference signal (SRS), or the like. The information associated with the RS resource may be an RS resource identifier, QCL information (especially QCL of type D and a spatial relation), or the like. The RS resource identifier corresponds to a transmit/receive beam pair previously established during measurement based on the RS resource. The terminal may infer beam information based on the RS resource index.

Optionally, the beam may further correspond to a spatial filter, a spatial domain filter, or a spatial domain transmission filter.

The receive beam may be equivalent to a spatial transmission filter, a spatial domain transmission filter, a spatial domain receive filter, or a spatial receive filter. The transmit beam may be equivalent to a spatial transmission filter, a spatial domain transmission filter, a spatial domain transmission filter, or a spatial transmission filter. Spatial relation parameter information may be equivalent to a spatial filter. Optionally, the spatial filter generally includes a spatial transmit filter and a spatial receive filter. The spatial filter may also be referred to as a spatial transmission filter. "Spatial" may also be expressed as "spatial domain". For example, the spatial filter may also be referred to as a spatial domain filter, and the spatial receive filter may also be referred to as a spatial domain receive filter. A receive beam on a terminal device side and a transmit beam on a network device side each may be a downlink spatial filter, and a transmit beam on the terminal device side and a receive beam on the network device side each may be an uplink spatial filter.

2. Spatial Relation Parameter Information

The spatial relation parameter information may be QCL information, or spatial relation information. Generally, the QCL information indicates a spatial relation parameter (which may also be referred to as a spatial relation characteristic) of a downlink signal (for example, a PDCCH/

PDSCH/CSI-RS/DMRS/TRS), and the spatial relation information indicates a spatial relation parameter (which may also be referred to as a spatial relation characteristic) of an uplink signal (for example, a PUCCH/PUSCH/SRS/DMRS).

Quasi co-location may also be referred to as quasi co-site or co-location. The QCL information may also be referred to as QCL assumption information. The QCL information is used to assist in describing receive beamforming information by the terminal device and a receiving procedure.

The QCL information may be used to indicate a QCL assumption between two reference signals. The target reference signal may usually be a DMRS, a CSI-RS, or the like, and the referenced reference signal or the referenced source reference signal may usually be a CSI-RS or a synchronization signal broadcast channel block (synchronous signal/PBCH block, SSB), a sounding reference signal (SRS), and the like. It should be understood that a TRS is also a type of CSI-RS. It should be understood that the target reference signal may usually be a downlink signal.

Signals corresponding to antenna ports having a QCL assumption may have a same or similar spatial characteristic parameter (or referred to as a parameter), or a spatial characteristic parameter (or referred to as a parameter) of one antenna port may be used to determine a spatial characteristic parameter (or referred to as a parameter) of another antenna port that has a QCL assumption with the antenna port, or two antenna ports have a same or similar spatial characteristic parameter (or referred to as a parameter), or a difference between spatial characteristic parameters (or referred to as parameters) of two antenna ports is less than a threshold.

The spatial relation information is used to assist in describing transmit side beamforming information and a transmission procedure of the terminal device.

The spatial relation information indicates a spatial transmit parameter assumption between two reference signals. The target reference signal may usually be a DMRS, an SRS, or the like. The referenced reference signal or the source reference signal may usually be a CSI-RS, an SRS, an SSB, or the like. It should be understood that, the target reference signal may usually be an uplink signal.

It should be understood that spatial characteristic parameters of two reference signals or channels that satisfy a QCL assumption are the same (close or similar), so that a spatial characteristic parameter of a target reference signal can be inferred based on a resource index of the source reference signal.

It should be further understood that spatial characteristic parameters of two reference signals or channels that satisfy spatial relation information are the same (close or similar), so that the spatial characteristic parameter of the target reference signal can be inferred based on the resource index of the source reference signal.

The spatial characteristic parameter includes one or more of the following parameters:

an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of a terminal device, receive beamforming of the terminal device, spatial channel relation, transmit beamforming of a network device, receive beamforming of the network device, an average channel gain, an average channel delay, a delay spread, a Doppler spread, a Doppler shift, a spatial reception parameter (spatial Rx parameters), or the like.

The foregoing angles may be decomposition values at different dimensions or a combination of decomposition values at different dimensions. The antenna ports may be antenna ports having different antenna port numbers, antenna ports that have a same antenna port number and that are used to send or receive information at different time points, on different frequencies, and/or on different code domain resources, and/or antenna ports that have different antenna port numbers and that are used to send or receive information at different time points, on different frequencies, and/or on different code domain resources.

The spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that, the terminal device may receive the target reference signal based on information about a receive beam for the source reference signal indicated by the QCL information. The spatial characteristic parameters further help the terminal device complete transmit-side beamforming or a transmission processing process based on the spatial relation information. It should be understood that the terminal device may transmit the target reference signal based on information about a transmit beam for the source reference signal indicated by the spatial relation information.

To reduce overheads of indicating the QCL information by the network device for the terminal device, in an optional implementation, the network device may indicate that a demodulation reference signal of the PDCCH or a physical downlink shared channel (PDSCH) and one or more of a plurality of reference signal resources previously reported by the terminal device satisfy a QCL assumption. For example, the reference signal may be a CSI-RS. Herein, an index of each reported CSI-RS resource corresponds to one transmit-receive beam pair that is previously established during measurement performed based on the CSI-RS resource. It should be understood that receive beam information of two reference signals or channels that satisfy a QCL assumption is the same, and the terminal device may infer, based on a resource index of the reference signal, receive beam information for receiving the PDCCH or the PDSCH.

Four types of QCL are defined in an existing standard, and the network device may simultaneously configure one or more types of QCL for the terminal device, for example, QCL types A+D, and QCL types C+D:

QCL type A: Doppler shift, Doppler spread, average delay, and delay spread

QCL type B: Doppler shift, and Doppler spread

QCL type C: average delay, and Doppler shift

QCL type D: Spatial Rx parameter

When the QCL assumption is a QCL assumption of the type D, the QCL assumption may be considered as spatial QCL. When the antenna ports satisfy the spatial QCL assumption, a QCL assumption (which is referred to as the spatial relation above) between a port of a downlink signal and a port of a downlink signal or between a port of an uplink signal and a port of an uplink signal may be that the two signals have a same AOA or AOD, and indicates that the two signals have a same receive beam or transmit beam. For another example, a QCL assumption between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From a perspective of the transmit end, if two antenna ports are spatially QCLed, it may mean that corresponding beam directions of the two antenna ports are consistent in space. From a perspective of the receive side, if two antenna ports are spatially QCLed, it may mean that the receive side can receive, in a same beam direction, signals sent by using the two antenna ports.

Signals transmitted on ports having a spatial QCL assumption may further have corresponding beams. The corresponding beams may include at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL assumption may alternatively be understood as signals received or sent by using a same spatial filter. The spatial filter may be at least one of the following: precoding, a weight of an antenna port, a phase deflection of the antenna port, or an amplitude gain of the antenna port.

Signals transmitted on ports having a spatial QCL assumption may alternatively be understood as having corresponding beam pair links (BPLs). The corresponding BPLs include at least one of the following: a same downlink BPL, a same uplink BPL, an uplink BPL corresponding to a downlink BPL, or a downlink BPL corresponding to an uplink BPL.

Therefore, the spatial receive parameter (namely, QCL Type D) may be understood as a parameter indicating direction information of a receive beam.

In an example of this application, correspondences of some parameters may also be used in descriptions of a QCL scenario.

It should be understood that, in a scenario applicable to a QCL assumption in this application, there may alternatively be an association assumption between two reference signals, or may further be an association assumption between transmission objects.

It should be noted that, with the continuous development of technologies, the terms in embodiments of this application may change, but all of the terms fall within the protection scope of this application.

To make objectives, technical solution, and advantages of embodiments of this application clearer, the following further describes embodiments of this application in detail with reference to the accompanying drawings.

The beam training method provided in embodiments of this application may be applied to a communication system in which two communication devices establish a beam pair link through beam training for communication. The communication system includes at least one or more network devices 101 and one or more terminal devices 103. The network device 101 and the terminal device 103 separately determine a paired beam in beam sets 102 and 104 through beam training, to establish a beam pair link for communication. The communication system that this application is applied to may be various communication systems, for example, the Internet of Things (IoT), a narrow band Internet of Things (NB-IoT), Long Term Evolution (LTE), a fifth generation (5G) communication system, a hybrid architecture of LTE and 5G, a 5G NR system, a new communication system emerging in future communication development, or the like. The 5G communication system described in this application may include at least one of a non-standalone (NSA) 5G communication system or a standalone (SA) 5G communication system. The communication system may also be a public land mobile network (public land mobile network, PLMN), a device-to-device (D2D) network, a machine to machine (macM2M) network, or another network.

A terminal device in embodiments of this application is an entity on a user side that is configured to receive or transmit a signal. The terminal device may be a device that provides voice and data connectivity for a user, for example, a handheld device or a vehicle-mounted device having a wireless connection function. The terminal device may alternatively be another processing device connected to a wireless modem. The terminal device may communicate with one or more core networks through a radio access network (RAN). The terminal device may also be referred to as a wireless terminal, a subscriber unit, a subscriber station, a mobile station, a mobile, a remote station, an access point, a remote terminal, an access terminal, a user terminal, a user agent, a user device, user equipment, or the like. The terminal device may be a mobile terminal, for example, a mobile phone (or referred to as a "cellular" phone), and a computer that has a mobile terminal. For example, the terminal device may be a portable, pocket-sized, handheld, computer built-in, or in-vehicle mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (mobile internet device, MID), and a wearable device such as a smartwatch, a smart band, or a pedometer. However, embodiments of this application are not limited thereto. The terminal device in embodiments of this application may alternatively be a terminal device or the like appearing in a future evolved PLMN. This is not limited in embodiments of this application.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this application is an entity on a network side configured to transmit or receive a signal. The network device in embodiments of this application may be a device in a wireless network, for example, a RAN node that connects the terminal to the wireless network. For example, the network device may be an evolved NodeB (evolved Node B, eNB or e-NodeB) in LTE, or may be a new radio controller (NR controller), may be a gNodeB (gNB) in a 5G system, may be a centralized unit (CU), may be a new radio base station, may be a radio remote module, may be a micro base station, may be a relay, may be a distributed unit (DU), may be a home base station, may be a transmission reception point (TRP) or a transmission point (TP), or may be any other wireless access device. This is not limited in embodiments of this application. The network device may cover one or more cells.

Figure 2:
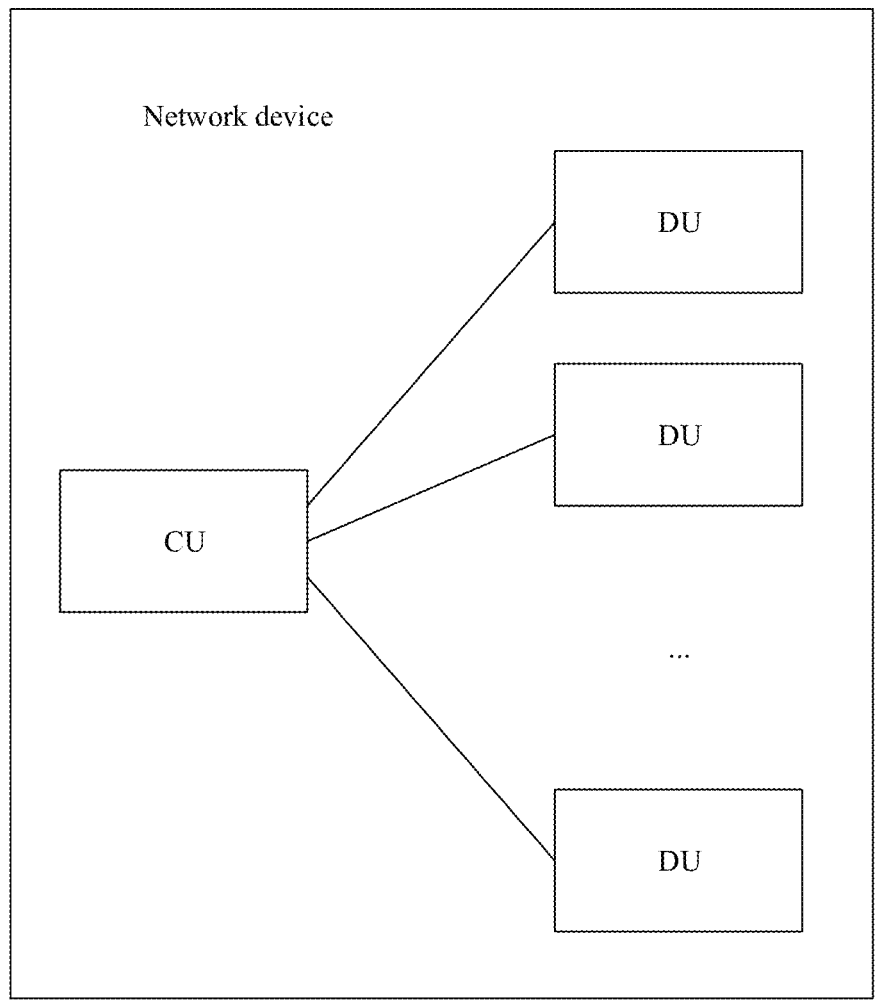
FIG. 2 is a schematic diagram of a structure of a distributed base station according to an embodiment of this application.

For example, a structure of a radio access network device in embodiments of this application may be shown in FIG. 2. Specifically, the radio access network device may be divided into a CU and at least one DU. The CU may be configured to manage or control the at least one DU, which may also be referred to as that the CU is connected to the at least one DU. In this structure, protocol layers of the radio access network device in the communication system may be split. Some protocol layers are controlled by the CU in a centralized manner, functions of some or all of remaining protocol layers are distributed in the DU, and the CU controls the DU in a centralized manner. For example, the radio access network device is a gNB. Protocol layers of the gNB include a radio resource control (RRC) layer, a service data adaptation protocol (SDAP) layer, a packet data convergence protocol (PDCP) layer, a radio link control (RLC) layer, a media access control (MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in embodiments of this application.

Figure 3:
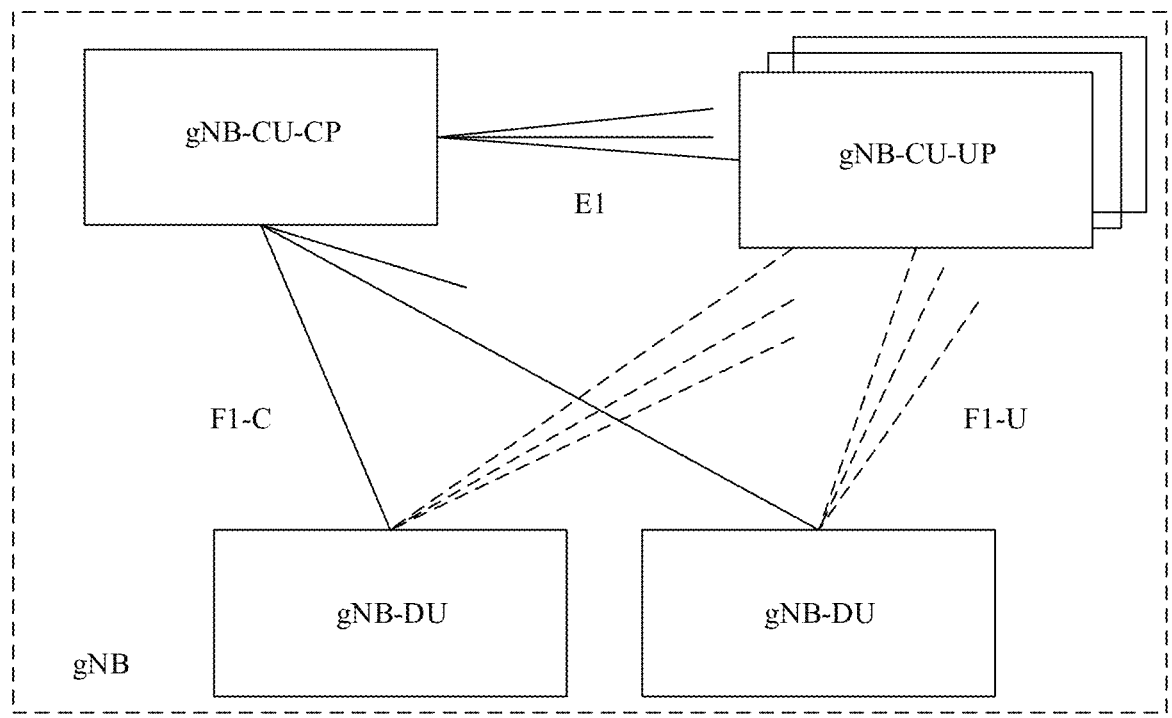
FIG. 3 is a schematic diagram of a structure of another distributed base station according to an embodiment of this application.

For example, the CU in embodiments of this application may be further divided into one control plane (CU-control plane, CU-CP) network element and a plurality of user plane (CU-user plane, CU-UP) network elements. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, a gNB is used as an example. A structure of the gNB may be shown in FIG. 3.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

High frequency bands, such as 28 GHz, 39 GHz, or 60 GHz, are added to 5G NR. A larger bandwidth and a higher transmission rate can be implemented by introducing the high frequency bands. Due to a high frequency, a signal suffers from severe fading during spatial propagation. Therefore, the 5G NR uses a beamforming (BF) technology to obtain a good directional gain, to increase directional power in a transmit direction, to improve a signal-to-interference-plus-noise ratio (SINR) at a receiver, and to improve system performance.

Both the gNB and the UE use a hybrid beamforming technology, and therefore, there is a transmit and receive beam management problem. This problem has become a central problem during the discussion of 5G NR standardization. Currently, content of beam management (including beam training, beam measurement and reporting, signal or channel beam indication, and the like) is standardized in 3GPP Rel-15.

Beam training includes a process of sweeping transmit and receive beams of the gNB and the UE. An objective of beam training is to find a beam pair, and the beam pair includes one transmit beam and one receive beam. When a transmit beam direction is aligned with a receive beam direction, a receive signal gain is higher. A beam training or sweeping process agreed in 3GPP Rel-15 is as follows.

Figure 4:
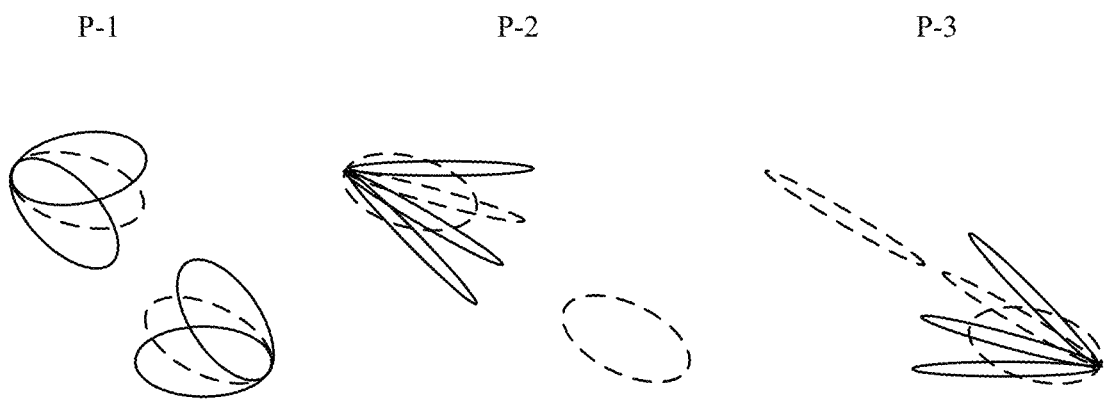
FIG. 4 is a schematic diagram of downlink beam training according to an embodiment of this application.

A downlink beam training process is shown in FIG. 4.

P-1 procedure: The gNB covers an area through transmit beam sweeping, and the UE is separately paired with a transmit beam of the gNB through receive beam sweeping, and performs measurement and reporting. The gNB and the UE select one or more appropriate beam pairs as an initial selection based on a measurement reporting result. To speed up the P-1 procedure, the gNB and the UE may select coarse beam sweeping. Currently, sweeping behaviors of the gNB and the UE in the P-1 procedure are not explicitly described in the 3GPP protocol.

P-2 procedure (transmit beam refinement of the gNB): The gNB performs fine beam sweeping based on an initial transmit beam selected in the P-1 procedure. A width of a transmit beam of the gNB in the P-2 procedure is less than a width of a transmit beam of the gNB in the P-1 procedure. The UE performs pairing, measurement, and reporting for a receive beam selected in the P-1 procedure or a receive beam indicated by the gNB and a transmit beam of the gNB, to train the transmit beam of the gNB and determine the transmit beam. Currently, the 3GPP protocol describes only identification of the P-2 procedure (repetition parameter of the reference signal=OFF), and the gNB implements main control of other configurations and processes.

P-3 procedure (receive beam refinement of the UE): The gNB fixedly sends a reference signal based on the transmit beam determined in the P-2 procedure training, and the UE performs fine transmit beam sweeping based on an initial receive beam selected in the P-1 procedure. A width of the receive beam of the UE in the P-2 procedure is less than a width of a receive beam of the UE in the P-1 procedure. The UE is paired with a transmit beam of the gNB through fine receive beam sweeping, and performs measurement and reporting, to train the receive beam of the UE. Currently, the 3GPP protocol describes only identification of the P-3 procedure (repetition of the reference signal=ON), and the gNB implements main control of other configurations and processes.

An uplink beam training process is similar to the downlink beam training process. The uplink beam training process is as follows:

U-1 procedure (coarse alignment): The UE covers an area through transmit beam sweeping, and the gNB is separately paired with each of the transmit beams of the UE through receive beam sweeping, and performs measurement and reporting. The UE and the gNB select one or more appropriate beam pairs as an initial selection based on a measurement reporting result. To speed up the U-1 procedure, the gNB and the UE may select coarse beam sweeping. Currently, sweeping behaviors of the gNB and the UE in the U-1 procedure are not explicitly described in the 3GPP protocol.

U-2 procedure (receive beam refinement of the gNB): The UE fixedly sends a reference signal by using a transmit beam selected in the U-1 procedure or a transmit beam indicated by the gNB. The gNB performs fine beam sweeping by using a receive beam selected in the U-1 procedure. A width of a receive beam of the gNB in the U-2 procedure is less than a width of the receive beam in the U-1 procedure. The gNB is paired with a transmit beam of the UE through fine receive beam sweeping, and performs measurement, to select an appropriate receive beam. Currently, the U-2 procedure is not clearly described in the 3GPP protocol. Based on common understanding, it is understood that when the gNB configures a same transmit beam for different reference signals of the UE, the process may be considered as the U-2 procedure.

U-3 procedure (transmit beam refinement of the UE): The UE performs fine beam sweeping based on a transmit beam selected in the U-1 procedure or a transmit beam indicated by the gNB. A width of the transmit beam of the UE in the U-1 procedure is less than a width of a transmit beam in the U-3 procedure. The gNB performs pairing, measurement, and reporting for a receive beam selected in the P-2 procedure and a transmit beam of the UE, to train the transmit beam of the UE and determine the transmit beam. Currently, the U-3 procedure is not clearly described in the 3GPP protocol. Based on common understanding, it is understood that when the gNB configures different transmit beams for different reference signals of the UE, the process may be considered as the U-3 procedure.

In the foregoing beam process, when repetition is configured to be 'ON' for the reference signal, the UE assumes that the gNB uses a same transmit beam for all reference signals in one reference signal set. When the repetition is configured to be 'OFF' for the reference signal, the UE does not assume that the gNB uses a same transmit beam for all reference signals in one reference signal set.

The P-1 procedure and the U-1 procedure are not clearly described in the 3GPP protocol, and a sweeping manner used by the gNB and the UE is not clear. As a result, beam training performance is poor. For example, when behaviors of the gNB and the UE are not aligned, beam training cannot be completed. For another example, inappropriate behaviors of the gNB and the UE lead to poor beam training performance, a large system delay, and the like.

Based on this, embodiments of this application provide a beam training method and an apparatus, to constrain beam sweeping behaviors of a base station and a terminal, so as to enhance accuracy and a speed of beam training. The method and an apparatus are based on a same inventive concept. Because the method and the apparatus have a similar problem-resolving principle, for implementations of the apparatus and the method, refer to each other, and no repeated description is provided.

It should be understood that, in embodiments of this application, "at least one" means one or more, and "a plurality of" means two or more. The term "and/or" describes an association assumption between associated objects, and represents that three assumptions may exist. For example, A and/or B may represent the following cases: Only A exists, both A and B exist, and only B exists, where A and B may be singular or plural. The character "/" generally indicates an "or" assumption between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In addition, it should be understood that in descriptions of this application, terms such as "first" and "second" are merely intended for purposes of description, shall not be understood as an indication or implication of relative importance, shall not be understood as an indication or implication of a sequence, and shall not be understood as a quantity.

The following provides a detailed description of the beam training method provided in this application with reference to accompanying drawings.

Figure 5:
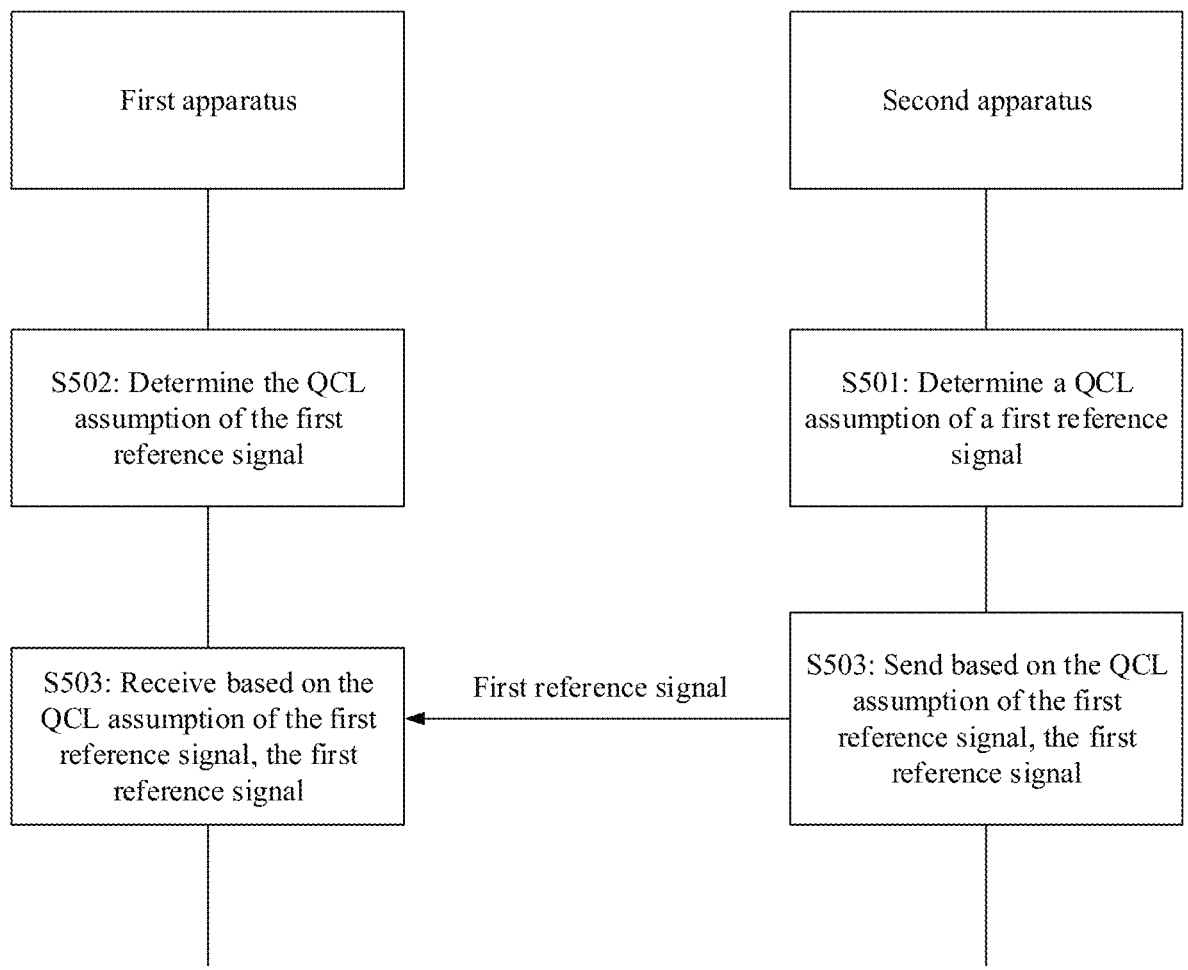
FIG. 5 is a schematic flowchart of a beam training method according to an embodiment of this application.

FIG. 5 shows a beam method according to an embodiment of this application. The method may be applied to the communication system shown in FIG. 1. For ease of understanding, this embodiment is described from perspectives of a first apparatus and a second apparatus. It should be understood that this does not constitute a limitation on this application. The first apparatus and the second apparatus are both improved in this application. Specifically, the method may be applied to a communication device, or a chip or a chip set of the communication device. To be specific, the first apparatus and the second apparatus may be the communication device, or the chip or the chip set of the communication device. The beam training method may specifically include the following steps.

S501: The second apparatus determines a QCL assumption of a first reference signal. The QCL assumption meets at least either of the following conditions: A plurality of periodic instances of the first reference signal at an interval of N periodicities have a same QCL assumption, where N is a positive integer; and first reference signals that have different indexes and that are in a same resource set have different QCL assumptions. The periodicity may be a sending periodicity of the first reference signal, or a receiving periodicity of the first reference signal.

A periodic instance of the first reference signal may be understood as the first reference signal sent in different periodicities. For example, the periodic instance of the first reference signal may include a first reference signal sent in a first periodicity, a first reference signal sent in a second periodicity, and the like. The plurality of periodic instances of the first reference signal at an interval of N periodicities may include a first reference signal sent in an $i^{th}$ periodicity, a first reference signal sent in an $(i+N)^{th}$ periodicity, a first reference signal sent in an $(i+2N)^{th}$ periodicity, . . . , and a first reference signal sent in an $(i+nN)^{th}$ periodicity, where n is an integer greater than or equal to 0.

For example, N is a quantity of transmit beams of the second apparatus.

Alternatively, N is determined based on the quantity of transmit beams of the second apparatus and a quantity of first reference signals. For example, N may be a value obtained by rounding up a value obtained by dividing the quantity of transmit beams by the quantity of first reference signals included in a resource set to which the first reference signals belong. In other words, N may meet the following formula:

$$N = \left\lceil \frac{a}{b} \right\rceil,$$

where a is the quantity of transmit beams, and b is the quantity of first reference signals included in the resource set in which the first reference signal is located.

Alternatively, N is a quantity of receive beams of the first apparatus.

Alternatively, N is determined based on the quantity of receive beams of the first apparatus and a quantity of first reference signals. For example, N may be a value obtained by rounding up a value obtained by dividing the quantity of receive beams by the quantity of first reference signals included in a resource set to which the first reference signals belong. In other words, N may meet the following formula:

$$N = \left\lceil \frac{c}{b} \right\rceil,$$

where c is the quantity of receive beams.

In an implementation, N may be related to repetition of the resource set in which the first reference signal is located. For example, if the repetition of the resource set in which the first reference signal is located is configured to be OFF, N may be equal to 0. If the repetition of the resource set in which the first reference signal is located is configured to be ON, N is a quantity of transmit beams of the second apparatus, or N is determined based on a quantity of transmit beams of the second apparatus and a quantity of first reference signals, or N is a quantity of receive beams of the first apparatus, or N is determined based on a quantity of receive beams of the first apparatus and a quantity of first reference signals.

In an example of description, if the first reference signal is a periodic signal, the QCL assumption may meet: A plurality of periodic instances of the first reference signal at an interval of N periodicities have a same QCL assumption. Alternatively, the QCL assumption may meet that first reference signals that have different indexes and that are in a same resource set have different QCL assumptions. Alternatively, the QCL assumption may meet: A plurality of periodic instances of the first reference signal at an interval of N periodicities have a same QCL assumption; and first reference signals that have different indexes and that are in a same resource set have different QCL assumptions.

If the first reference signal is a non-periodic signal, the QCL assumption may meet that first reference signals that have different indexes and that are in a same resource set have different QCL assumptions.

In an example description, the QCL assumption may be specified in a protocol, or may be negotiated by a base station and a terminal device, or may be determined and indicated by a base station to a terminal device, or the like. A manner in which the first apparatus and the second apparatus obtain the QCL assumption is not limited in this application.

S502: The first apparatus determines the QCL assumption of the first reference signal.

S503: The second apparatus sends, based on the QCL assumption of the first reference signal, the first reference signal to the first apparatus. Correspondingly, the first apparatus receives, based on the QCL assumption of the first reference signal, the first reference signal sent by a second apparatus.

For example, the first apparatus may be an apparatus that performs training by using the receive beam, and the second apparatus may be an apparatus that performs training by using the transmit beam. For example, in a downlink beam training process, the first apparatus may be a terminal device, and the second apparatus may be a network device. In an uplink beam training process, the first apparatus may be the network device, and the second apparatus may be the terminal device.

In a possible implementation, the QCL assumption may constrain a transmit beam of the second apparatus.

In the implementation, if the QCL assumption meets that a plurality of periodic instances of the first reference signal at an interval of N periodicities of the first reference signal have a same QCL assumption, the second apparatus may send the plurality of periodic instances of the first reference signal at an interval of N periodicities by using a same transmit beam, and the first apparatus may receive the plurality of periodic instances of the first reference signal at an interval of N periodicities by using a same receive beam or different receive beams. In the foregoing implementation, the first apparatus may assume that a same downlink spatial domain transmission filter (which may also be referred to as a transmit beam) is used for transmission of the plurality of periodic instances of the first reference signal at an interval of N periodicities.

Further, whether the first apparatus specifically receives the plurality of periodic instances of the first reference signal at an interval of N periodicities by using a same receive beam or different receive beams may be related to the repetition of the resource set in which the first reference signal is located.

For example, if the repetition of the resource set in which the first reference signal is located is configured to be OFF, the first apparatus may receive the plurality of periodic instances by using the same receive beam. In addition, within one sweeping periodicity, the first apparatus may receive, by using a same receive beam, first reference signals that have different indexes and that are in a same resource set.

The sweeping periodicity is a maximum value of periodicities of the first reference signals that have the different indexes and that are in the same resource set.

If the repetition parameter of a resource set in which the first reference signal is located is configured to be ON, the first apparatus may receive the plurality of periodic instances by using different receive beams. In addition, within one sweeping periodicity, the first apparatus may receive, by using the different receive beams, first reference signals that have different indexes and that are in a same resource set.

For another example, if the repetition of the resource set in which the first reference signal is located is configured to be OFF, the first apparatus may receive the plurality of periodic instances by using the different receive beams. In addition, within one sweeping periodicity, the first apparatus may receive, by using a same receive beam, first reference signals that have different indexes and that are in a same resource set.

Figure 6:
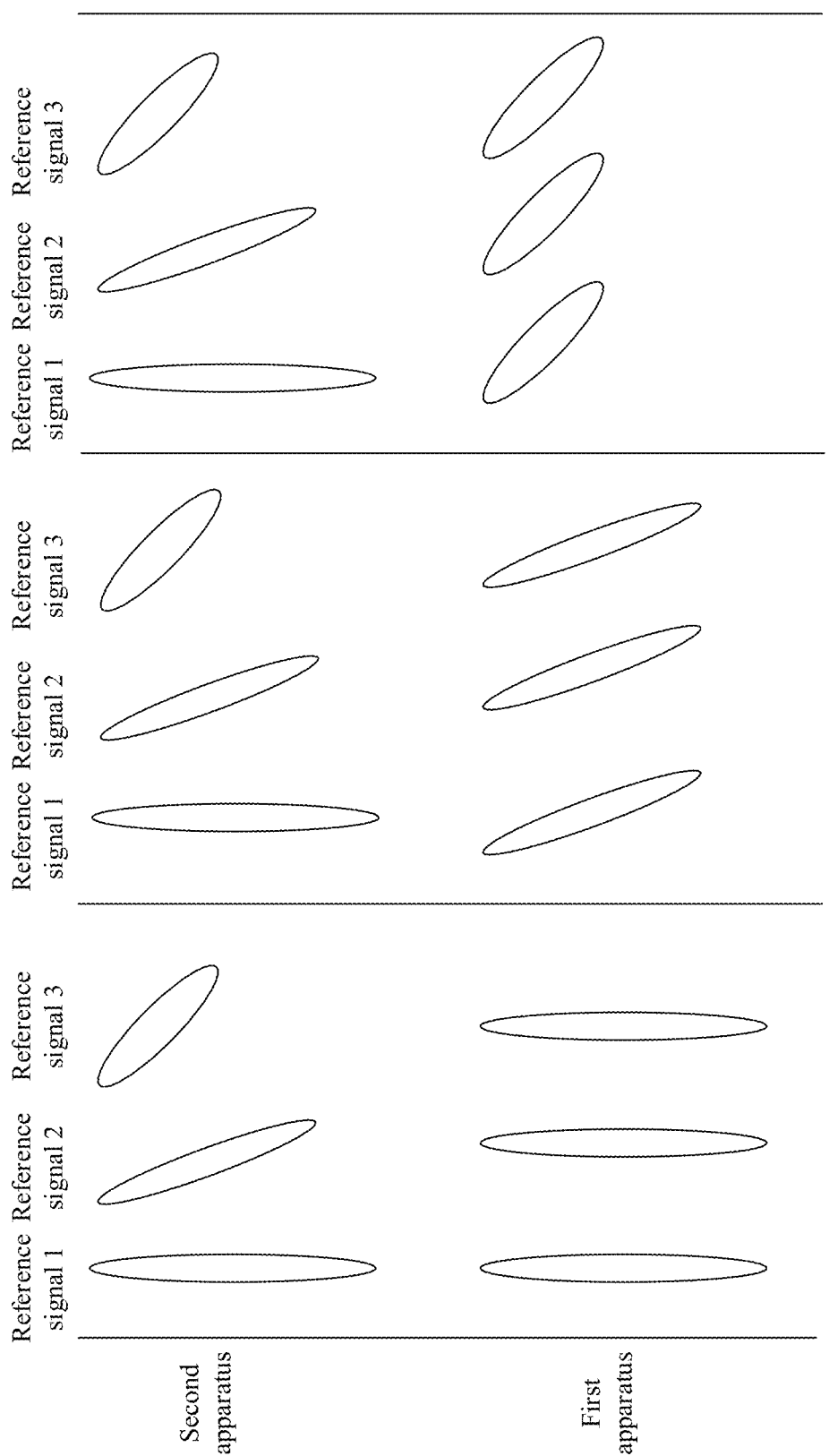
FIG. 6 is a schematic diagram of a beam sweeping behavior according to an embodiment of this application.

For example, when the repetition of the resource set in which the first reference signal is located is configured to be OFF, the second apparatus may send different periodic instances of one first reference signal by using a same transmit beam (in other words, different periodic instances of the first reference signal with a same index are sent by using the same transmit beam). In other words, N is equal to 1. In addition, within a same sweeping periodicity, the first reference signals that have different indexes and that are in the same resource set are sent by using the different transmit beams. The first apparatus may receive different periodic instances of one first reference signal by using the different receive beams. In other words, N is equal to 1. Within one sweeping periodicity, the first reference signals that have different indexes and that are in a same resource set are received by using a same receive beam. For example, the resource set includes reference signals 1 to 3, the reference signals 1 to 3 have a same periodicity, a sweeping periodicity is equal to the periodicity of the reference signals 1 to 3, and N is equal to 1. The second apparatus may separately send the reference signals 1 to 3 by using three different transmit beams. Different periodic instances of the reference signal 1 are sent by using a same transmit beam. Different periodic instances of the reference signal 2 are sent by using a same transmit beam. Different periodic instances of the reference signal 3 are sent by using a same transmit beam. The first apparatus may separately receive three periodic instances of the reference signal 1 by using three different receive beams. In a same sweeping periodicity, reference signals 1 to 3 are received by using a same receive beam, as shown in FIG. 6.

If the repetition parameter of the resource set in which the first reference signal is located is configured to be ON, the first apparatus may receive the plurality of periodic instances of the first reference signal at an interval of N periodicities by using a same receive beam (in other words, the periodic instances of the first reference signal in N periodicities with a same index are received by using the same receive beam). In addition, within a same sweeping periodicity, the first apparatus may receive, by using the different receive beams, first reference signals that have different indexes and that are in a same resource set.

Figure 7A:
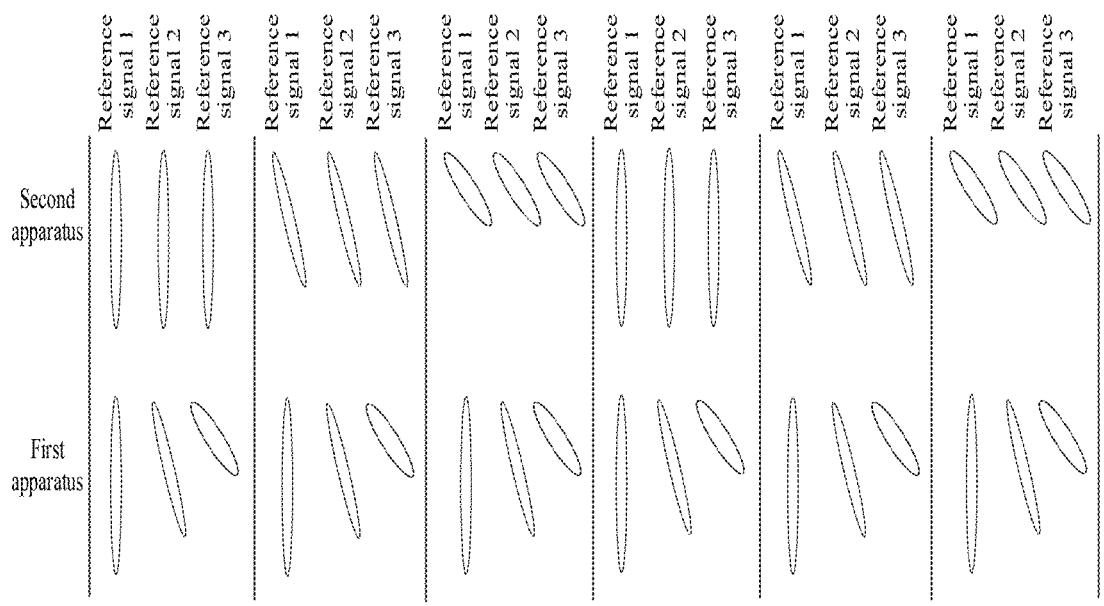
FIG. 7A is a schematic diagram of another beam sweeping behavior according to an embodiment of this application.

For example, it is assumed that N is equal to 3. When the repetition of the resource set in which the first reference signal is located is configured to be ON, in a same sweeping periodicity, the second apparatus may send the first reference signals that have different indexes and that are in the same resource set by using a same transmit beam. In addition, for one first reference signal, the second apparatus may send a plurality of periodic instances of the one first reference signal at an interval of three periodicities by using a same transmit beam (in other words, periodic instances of the first reference signal with a same index at an interval of three periodicities are sent by using the same transmit beam). The first apparatus may receive different periodic instances of one first reference signal by using a same receive beam (in other words, periodic instances at an interval of three periodicities of the first reference signal with a same index are received by using the same receive beam). Within one sweeping periodicity, the first reference signals that have different indexes and that are in a same resource set are received by using different receive beams. For example, the resource set includes reference signals 1 to 3, the reference signals 1 to 3 have a same periodicity, a sweeping periodicity is equal to the periodicity of the reference signals 1 to 3, and N is equal to 3. The second apparatus may send the reference signals 1 to 3 within a same sweeping periodicity by using a same transmit beam. A first periodic instance and a fourth periodic instance of the reference signal 1 are sent by using a same transmit beam. A first periodic instance and a fourth periodic instance of the reference signal 2 are sent by using a same transmit beam. A first periodic instance and a fourth periodic instance of the reference signal 3 are sent by using a same transmit beam. The first apparatus may separately send the reference signals 1 to 3 within a same sweeping periodicity by using three different transmit beams, as shown in FIG. 7A. Different periodic instances of the reference signal 1 are received by using a same receive beam. Different periodic instances of the reference signal 2 are received by using a same receive beam. Different periodic instances of the reference signal 3 are received by using a same receive beam.

In the implementation, if the QCL assumption meets that first reference signals that have different indexes and that are in a same resource set have different QCL assumptions, the second apparatus may send the first reference signals that have different indexes and that are in the same resource set by using different transmit beams, and the first apparatus may receive the first reference signals that have different indexes and that are in the same resource set by using the same receive beam. In the foregoing implementation, the first apparatus may assume that different downlink spatial domain transmission filters (which may also be referred to as transmit beams) are used for transmission of the first reference signals that have different indexes and that are in the same resource set.

In another implementation, the QCL assumption may further constrain a receive beam of the first apparatus.

In the implementation, if the QCL assumption meets that a plurality of periodic instances of the first reference signal at an interval of N periodicities have a same QCL assumption, the second apparatus may send the plurality of periodic instances of the first reference signal at an interval of N periodicities by using a same transmit beam or different transmit beams. The first apparatus may further receive by using different receive beams.

Further, whether the second apparatus specifically sends the plurality of periodic instances of the first reference signal at an interval of N periodicities by using a same transmit beam or different transmit beams may be related to the repetition of the resource set in which the first reference signal is located.

For example, if the repetition parameter of the resource set in which the first reference signal is located is configured to be OFF, the second apparatus may send the plurality of periodic instances by using the same transmit beam.

For another example, if the repetition parameter of a resource set in which the first reference signal is located is configured to be ON, the second apparatus may send the plurality of periodic instances by using different transmit beams.

In the implementation, if the QCL assumption meets that first reference signals that have different indexes and that are in a same resource set have different QCL assumptions, the second apparatus sends first reference signals that have different indexes and that are in the same resource set by using a same transmit beam, and the first apparatus may further receive the first reference signals that have different indexes and that are in the same resource set by using different receive beams.

In some embodiments, the network device may configure the first reference signal and the second reference signal for beam training. The first reference signal may be used to measure a channel, in other words, the first reference signal is a CMR. The second reference signal may be used to measure interference, in other words, the second reference signal is an IMR. In this way, the first apparatus may measure the channel based on the first reference signal, and measure the interference based on the second reference signal. Alternatively, the second reference signal may be used to measure a channel, in other words, the second reference signal is a CMR. The first reference signal may be used to measure interference, in other words, the first reference signal is an IMR. In this way, the first apparatus may measure the channel based on the second reference signal, and measure the interference based on the first reference signal.

In an implementation, if the QCL assumption is not configured for the first reference signal, the first apparatus and the second apparatus may use a QCL assumption of a second reference signal associated with the first reference signal as the QCL assumption of the first reference signal.

If no QCL assumption is configured for the second reference signal associated with the first reference signal, the first apparatus and the second apparatus may receive the second reference signal based on the QCL assumption of the first reference signal.

The first reference signal and the second reference signal may be the same or different. This is not limited herein. The first reference signal and the second reference signal may be but are not limited to CSI-RSs, SSBs, and the like.

In some other embodiments, the network device may configure the first reference signal for beam training. The first reference signal may be used to measure a channel, in other words, the first reference signal is a CMR. In this way, the first apparatus may measure the channel and the interference based on the first reference signal. For example, the first reference signal may be a CSI-RS.

In an implementation, the beam training method provided in this embodiment of this application may be implemented when no QCL assumption is configured for the first reference signal.

To better understand the QCL assumption, the following describes the QCL assumption by using an example in which the first reference signal is a CMR, the second reference signal is an IMR, and the QCL assumption is used to constrain a transmit beam. It should be understood that this is merely an example for description herein, and does not specifically limit the QCL assumption.

Example 1: If the CMR is a CSI-RS, and the CMR is configured to be a CSI-RS with no QCL assumption (or the CMR is not configured with a QCL assumption): If the CMR is a periodic signal, different periodic instances of one CSI-RS have a same QCL assumption, in other words, N is equal to 1; or different discrete or discontinuous periodic instances of one CSI-RS have a same QCL assumption, in other words, N is greater than 1; or all CSI-RSs in one CSI-RS set do not have a same QCL assumption. If the CMR is a non-periodic signal, CSI-RSs that have different indexes and that are in one CSI-RS set do not have a same QCL assumption.

Example 2: If the CMR and an associated IMR are both CSI-RSs, the CMR is configured to be a CSI-RS with no QCL assumption (or the CMR is not configured with a QCL assumption), and the associated IMR is or is not configured with a QCL assumption: If the CMR and the IMR are both periodic signals, different periodic instances of one CSI-RS of the CMR have a QCL assumption, in other words, N is equal to 1; or CSI-RSs of the CMR that have different indexes and that are in one CSI-RS set have a same QCL assumption; or CSI-RSs of the CMR that have different indexes and that are in one CSI-RS set do not have a same QCL assumption. Correspondingly, different periodic instances of one CSI-RS of the IMR have a QCL assumption, in other words, N is equal to 1. Alternatively, CSI-RSs of the IMR that have different indexes and that are in one CSI-RS set have a same QCL assumption. Alternatively, CSI-RSs of the IMR that have different indexes and that are in one CSI-RS set do not have a same QCL assumption.

For example, downlink beam training is used as an example, to be specific, the first apparatus is a terminal device and the second apparatus is a base station, to describe beam training with reference to two scenarios.

Scenario 1: The CMR is configured to be a periodic CSI-RS (P-CSI-RS) whose attribute of repetition is configured to be 'OFF' and that is not configured with a QCL assumption. The IMR associated with the CMR is configured to be a P-CSI-RS whose attribute of repetition is configured to be 'ON' and that is not configured with a QCL assumption.

If N is equal to 1, for the CMR, the base station may send different periodic instances of one CSI-RS by using a same transmit beam, and send CSI-RSs that have different indexes and that are in one CSI-RS set by using different transmit beams in a same sweeping periodicity. For the IMR, the base station may send different periodic instances of one CSI-RS by using different transmit beams, and send CSI-RSs that have different indexes and that are in one CSI-RS set by using a same transmit beam in a same sweeping periodicity. For the CMR, the terminal device may receive different periodic instances of one CSI-RS by using different receive beams, and receive CSI-RSs that have different indexes and that are in one CSI-RS set by using a same receive beam in a same sweeping periodicity. For the IMR, the terminal device may receive different periodic instances of one CSI-RS by using different receive beams, and receive CSI-RSs that have different indexes and that are in one CSI-RS set by using a same receive beam in a same sweeping periodicity.

Figure 7B:
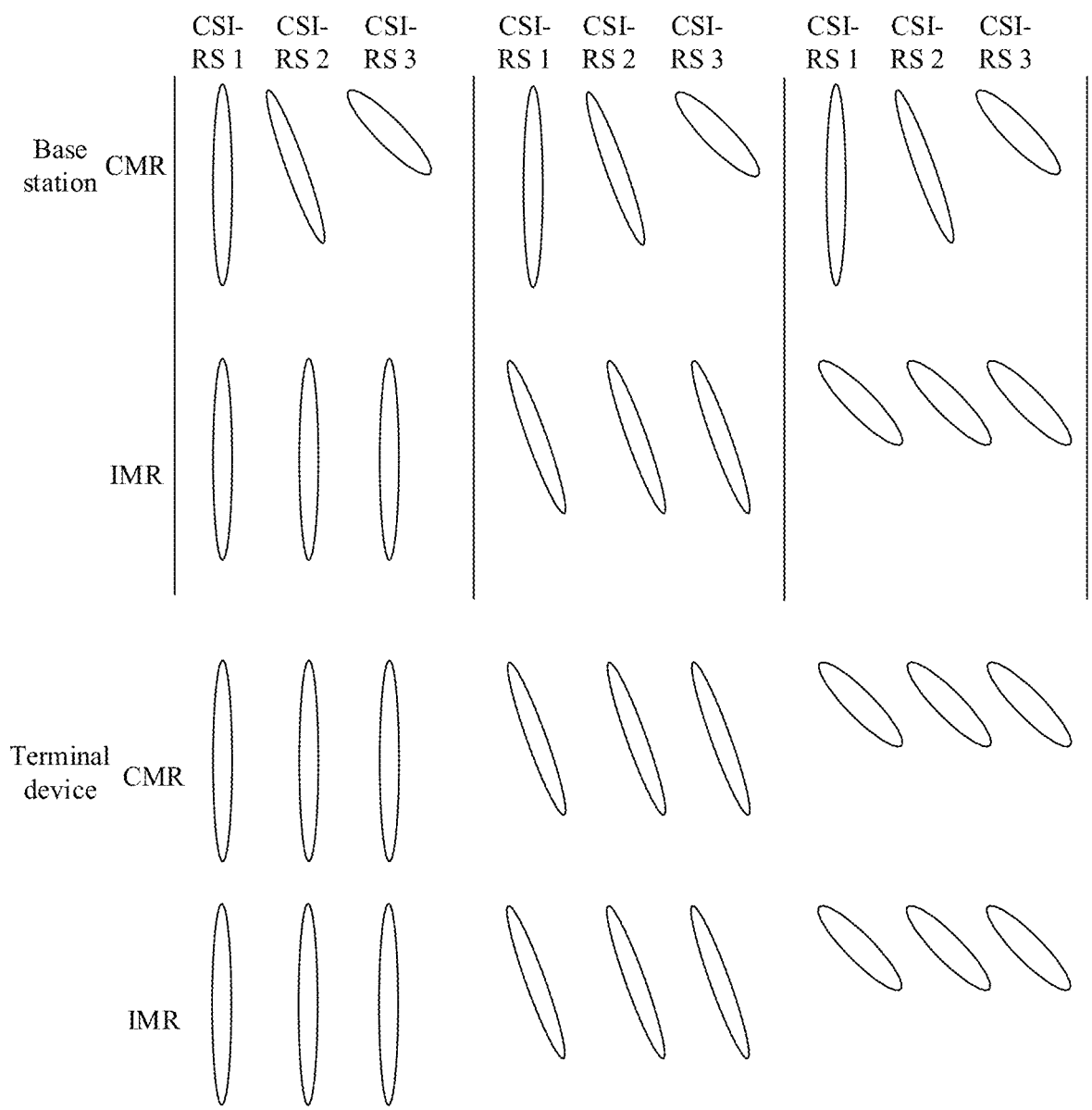
FIG. 7B is a schematic diagram of a beam sweeping behavior in a scenario 1 according to an embodiment of this application.

For example, both the CMR and the IMR are CSI-RS sets including CSI-RSs 1 to 3, a periodicity of the CSI-RSs 1 to 3 is the same, and a sweeping periodicity is the periodicity of the CSI-RSs 1 to 3. For the CMR, the base station may separately send CSI-RSs 1 to 3 in a same sweeping periodicity by using three different transmit beams. Different periodic instances of the CSI-RS 1 are sent by using a same transmit beam. Different periodic instances of the CSI-RS 2 are sent by using a same transmit beam. Different periodic instances of the CSI-RS 3 are sent by using a same transmit beam. For the IMR, the base station may separately send three periodic instances of the CSI-RS 1 by using three different transmit beams (similarly, three periodic instances of the CSI-RS 2 or the CSI-RS 3 are also sent by using different transmit beams). In addition, the CSI-RSs 1 to 3 are sent by using a same transmit beam in a same sweeping periodicity. For the CMR, the terminal device may separately receive three periodic instances of one CSI-RS by using three different receive beams. In addition, the CSI-RSs 1 to 3 are received by using a same receive beam in a same sweeping periodicity. For the IMR, the terminal device may receive three periodic instances of the CSI-RS 1 by using three different receive beams (similarly, three periodic instances of the CSI-RS 2 or the CSI-RS 3 are also received by using different receive beams). In addition, the CSI-RSs 1 to 3 are received by using a same receive beam in a same sweeping periodicity, as shown in FIG. 7B.

Scenario 2: The CMR is configured to be a periodic CSI-RS (P-CSI-RS) whose attribute of repetition is configured to be 'OFF' and that is not configured with a QCL assumption. The IMR associated with the CMR is configured to be a P-CSI-RS whose attribute of repetition is configured to be 'OFF' and that is not configured with a QCL assumption.

If N is equal to 1, for the CMR, the base station may send different periodic instances of one CSI-RS by using a same transmit beam, and send CSI-RSs that have different indexes and that are in one CSI-RS set by using different transmit beams in a same sweeping periodicity. For the IMR, the base station may send different periodic instances of one CSI-RS by using a same transmit beam, and send CSI-RSs that have different indexes and that are in one CSI-RS set by using different transmit beams in a same sweeping periodicity. For the CMR, the terminal device may receive different periodic instances of one CSI-RS by using different receive beams, and receive CSI-RSs that have different indexes and that are in one CSI-RS set by using a same receive beam in a same sweeping periodicity. For the IMR, the terminal device may receive different periodic instances of one CSI-RS by using different receive beams, and receive CSI-RSs that have different indexes and that are in one CSI-RS set by using a same receive beam in a same sweeping periodicity.

Figure 7C:
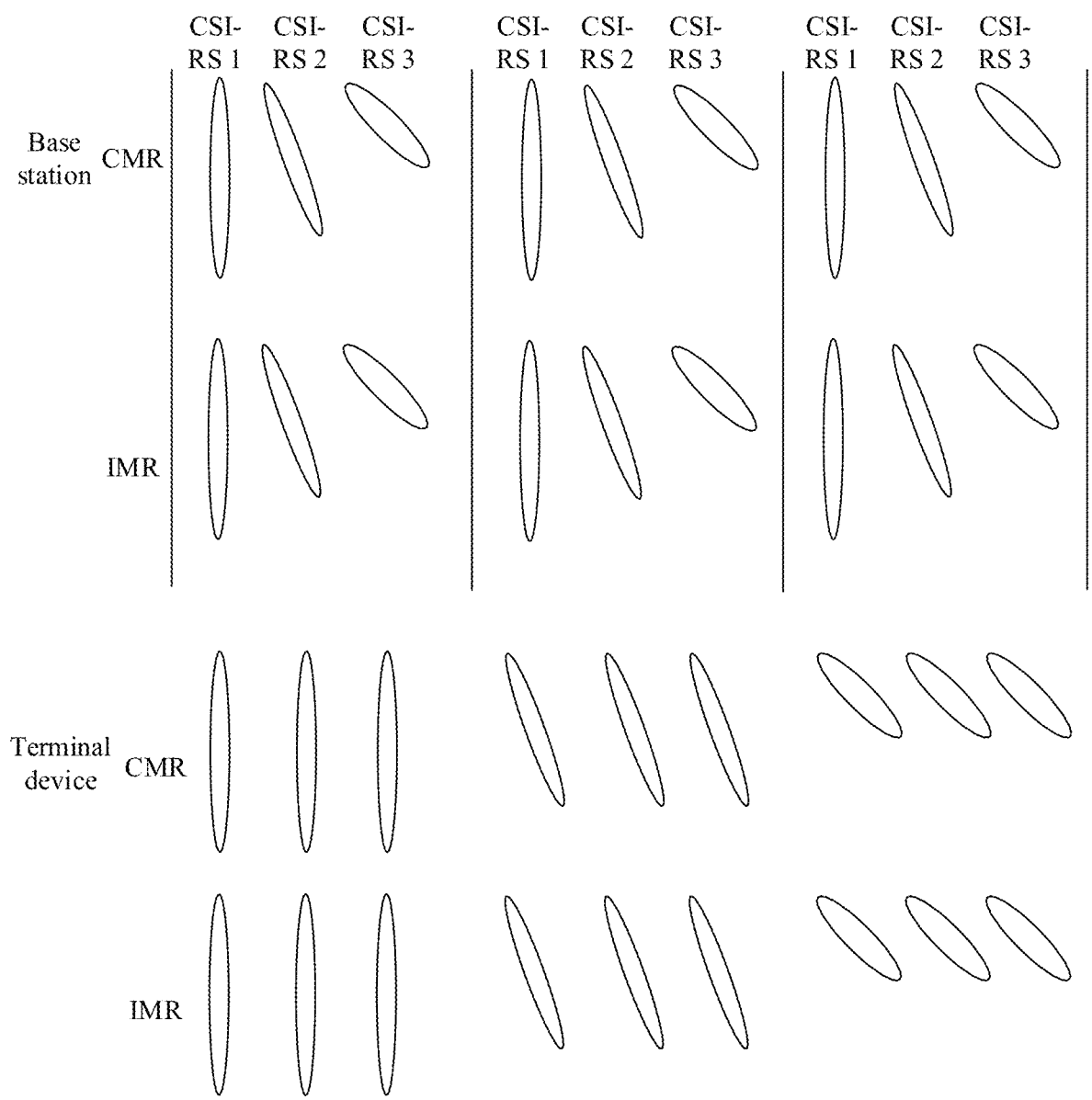
FIG. 7C is a schematic diagram of a beam sweeping behavior in a scenario 2 according to an embodiment of this application.

For example, both the CMR and the IMR are CSI-RS sets including CSI-RSs 1 to 3, a periodicity of the CSI-RSs 1 to 3 is the same, and a sweeping periodicity is the periodicity of the CSI-RSs 1 to 3. For the CMR, the base station may separately send CSI-RSs 1 to 3 in a same sweeping periodicity by using three different transmit beams. Different periodic instances of the CSI-RS 1 are sent by using a same transmit beam. Different periodic instances of the CSI-RS 2 are sent by using a same transmit beam. Different periodic instances of the CSI-RS 3 are sent by using a same transmit beam. For the IMR, the base station may separately send CSI-RSs 1 to 3 in a same sweeping periodicity by using three different transmit beams. Different periodic instances of the CSI-RS 1 are sent by using a same transmit beam. Different periodic instances of the CSI-RS 2 are sent by using a same transmit beam. Different periodic instances of the CSI-RS 3 are sent by using a same transmit beam. For the CMR, the terminal device may separately receive three periodic instances of one CSI-RS by using three different receive beams. In addition, the CSI-RSs 1 to 3 are received by using a same receive beam in a same sweeping periodicity, as shown in FIG. 7C.

For example, downlink beam training is used as an example, to be specific, the first apparatus is a terminal device and the second apparatus is a base station, to describe beam training with reference to two scenarios.

Scenario 3: The CMR is configured to be a periodic CSI-RS (P-CSI-RS) whose attribute of repetition is configured to be 'ON' and that is not configured with a QCL assumption. The IMR associated with the CMR is configured to be a P-CSI-RS whose attribute of repetition is configured to be 'ON' and is not configured with a QCL assumption.

If N is equal to 3, for the CMR, the base station may send CSI-RSs that have different indexes and that are in one CSI-RS set by using a same transmit beam in a same sweeping periodicity. In addition, the base station may send a plurality of periodic instances of one CSI-RS at an interval of three periodicities by using a same transmit beam. The IMR and the CMR are sent in a same way. For the CMR, the terminal device may receive different periodic instances of one CSI-RS by using a same receive beam, and receive CSI-RSs that have different indexes and that are in one CSI-RS set by using different receive beams in a same sweeping periodicity. For the IMR, the terminal device may receive different periodic instances of one CSI-RS by using a same receive beam, and receive CSI-RSs that have different indexes and that are in one CSI-RS set by using different receive beams in a same sweeping periodicity.

Figure 7D:
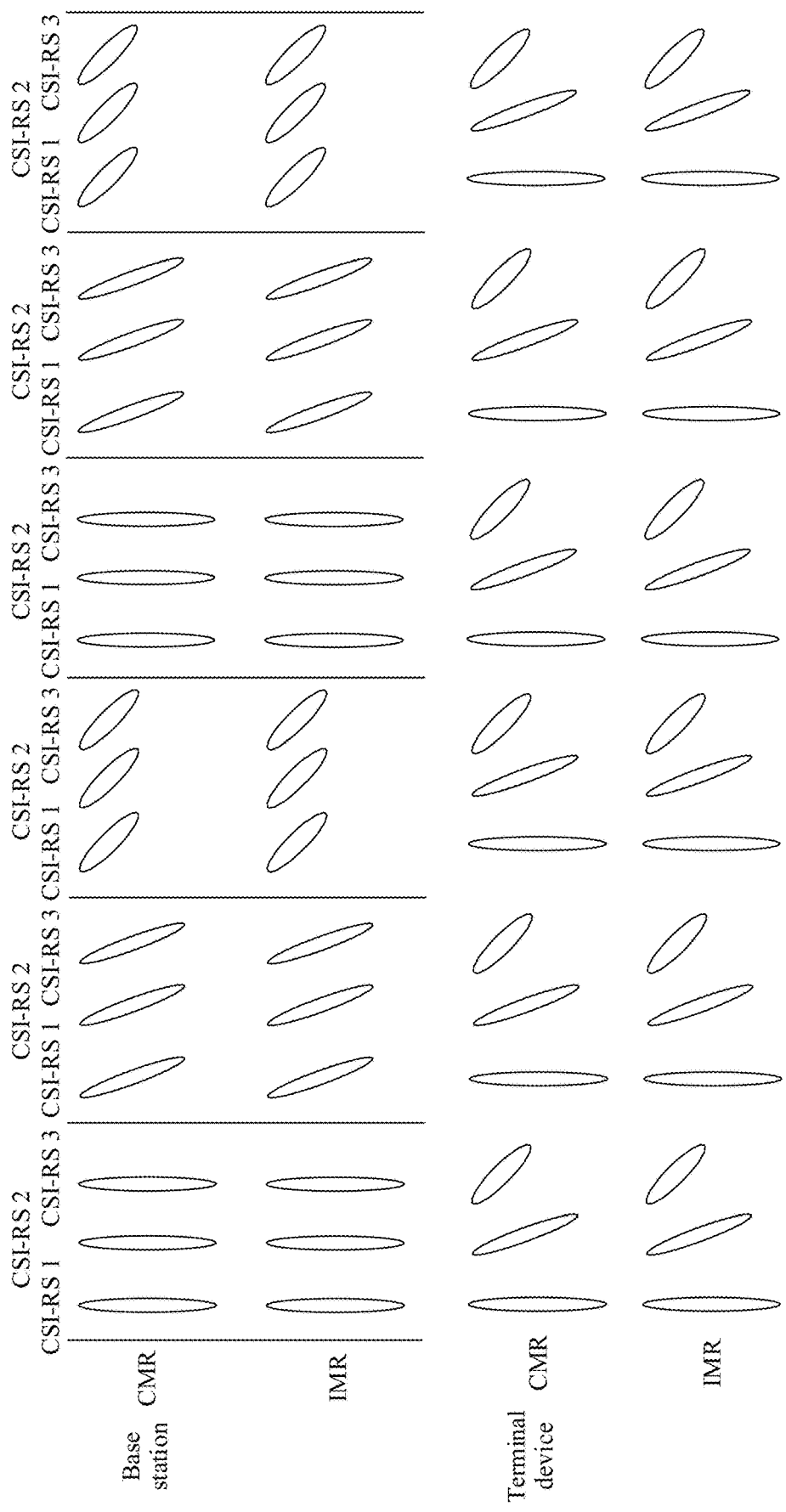
FIG. 7D is a schematic diagram of a beam sweeping behavior in a scenario 3 according to an embodiment of this application.

For example, both the CMR and the IMR are CSI-RS sets including CSI-RSs 1 to 3, a periodicity of the CSI-RSs 1 to 3 is the same, and a sweeping periodicity is the periodicity of the CSI-RSs 1 to 3. For the CMR, the base station may send CSI-RSs 1 to 3 in a same sweeping periodicity by using a same transmit beam. A first periodic instance and a fourth periodic instance of the CSI-RS 1 are sent by using a same transmit beam. A first periodic instance and a fourth periodic instance of the CSI-RS 2 are sent by using a same transmit beam. A first periodic instance and a fourth periodic instance of the CSI-RS 3 are sent by using a same transmit beam. The IMR and the CMR may be sent in a same manner. The IMR and CMR messages are sent in the same way. For the CMR, the terminal device may separately receive the CSI-RSs 1 to 3 by using three different receive beams within a same sweeping periodicity, as shown in FIG. 7D. Different periodic instances of the CSI-RS 1 are received by using a same receive beam. Different periodic instances of the CSI-RS 2 are received by using a same receive beam. Different periodic instances of the CSI-RS 3 are received by using a same receive beam. The IMR and the CMR may be received in a same way.

Scenario 4: The CMR is configured to be a periodic CSI-RS (P-CSI-RS) whose attribute of repetition is configured to be 'ON' and that is not configured with a QCL assumption. The IMR associated with the CMR is configured to be a P-CSI-RS whose attribute of repetition is configured to be 'OFF' and that is not configured with a QCL assumption.

If N is equal to 3, for the CMR, the base station may send CSI-RSs that have different indexes and that are in one CSI-RS set by using a same transmit beam in a same sweeping periodicity. In addition, the base station may send a plurality of periodic instances of one CSI-RS at an interval of three periodicities by using a same transmit beam. For the IMR, the base station may send different periodic instances of one CSI-RS by using a same transmit beam, and send CSI-RSs that have different indexes and that are in one CSI-RS set by using different transmit beams in a same sweeping periodicity. For the CMR, the terminal device may receive different periodic instances of one CSI-RS by using a same receive beam, and receive CSI-RSs that have different indexes and that are in one CSI-RS set by using different receive beams in a same sweeping periodicity. For the IMR, the terminal device may receive different periodic instances of one CSI-RS by using a same receive beam, and receive CSI-RSs that have different indexes and that are in one CSI-RS set by using different receive beams in a same sweeping periodicity.

Figure 7E:
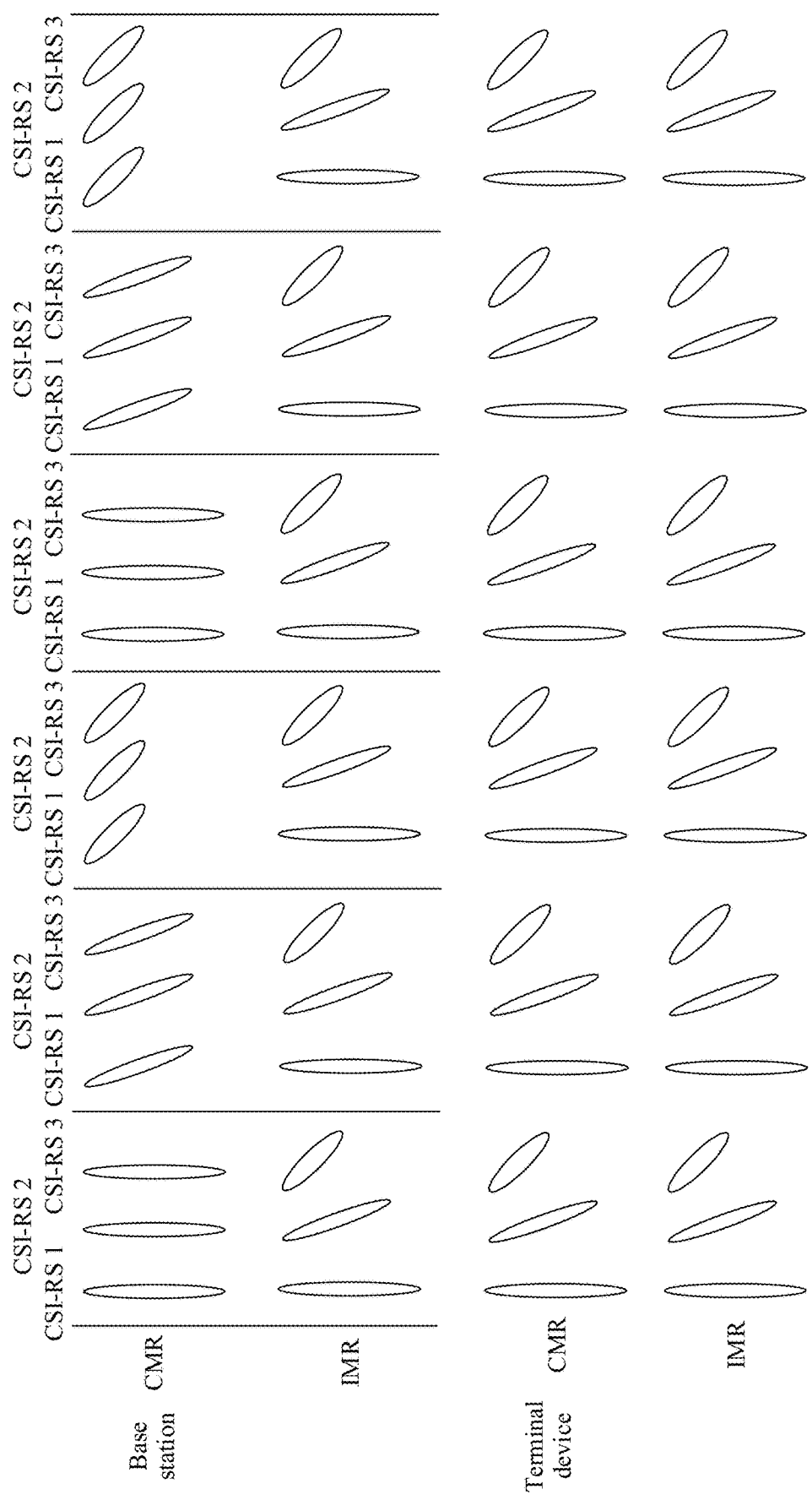
FIG. 7E is a schematic diagram of a beam sweeping behavior in a scenario 4 according to an embodiment of this application.

For example, both the CMR and the IMR are CSI-RS sets including CSI-RSs 1 to 3, a periodicity of the CSI-RSs 1 to 3 is the same, and a sweeping periodicity is the periodicity of the CSI-RSs 1 to 3. For the CMR, the base station may send CSI-RSs 1 to 3 in a same sweeping periodicity by using a same transmit beam. A first periodic instance and a fourth periodic instance of the CSI-RS 1 are sent by using a same transmit beam. A first periodic instance and a fourth periodic instance of the CSI-RS 2 are sent by using a same transmit beam. A first periodic instance and a fourth periodic instance of the CSI-RS 3 are sent by using a same transmit beam. For the IMR, the base station may separately send CSI-RSs 1 to 3 in a same sweeping periodicity by using three different transmit beams. Different periodic instances of the CSI-RS 1 are sent by using a same transmit beam. Different periodic instances of the CSI-RS 2 are sent by using a same transmit beam. Different periodic instances of the CSI-RS 3 are sent by using a same transmit beam. For the CMR, the terminal device may separately receive the CSI-RSs 1 to 3 by using three different receive beams within a same sweeping periodicity, as shown in FIG. 7E. Different periodic instances of the CSI-RS 1 are received by using a same receive beam. Different periodic instances of the CSI-RS 2 are received by using a same receive beam. Different periodic instances of the CSI-RS 3 are received by using a same receive beam. The IMR and the CMR may be received in a same way.

Example 3: If the CMR and an associated IMR are both CSI-RSs, the CMR is configured to be a CSI-RS with no QCL assumption (or the CMR is not configured with a QCL assumption), and the associated IMR is or is not configured with a QCL assumption. If the CMR and the IMR are both non-periodic signals, CSI-RSs of the CMR that have different indexes and that are in one CSI-RS set do not have a same QCL assumption. Correspondingly, CSI-RSs that have different indexes and that are in one CSI-RS set of the IMR have a same QCL assumption. Alternatively, CSI-RSs that have different indexes and that are in one CSI-RS set of the IMR do not have a same QCL assumption.

Example 4: If the CMR and an associated IMR are both CSI-RSs, the CMR is configured to be a CSI-RS with no QCL assumption (or the CMR is not configured with a QCL assumption), and the associated IMR is configured with a QCL assumption. The CMR may use the QCL assumption configured for the associated IMR, so that the first apparatus may receive the CMR by using the QCL assumption of the IMR.

In this embodiment of this application, beam sweeping behaviors of a base station and a terminal can be performed by using a QCL assumption of a reference signal, so that the beam sweeping behaviors of the base station and the terminal can be aligned. This can enhance the speed and accuracy of beam training, and further improve beam training performance.

Figure 8:
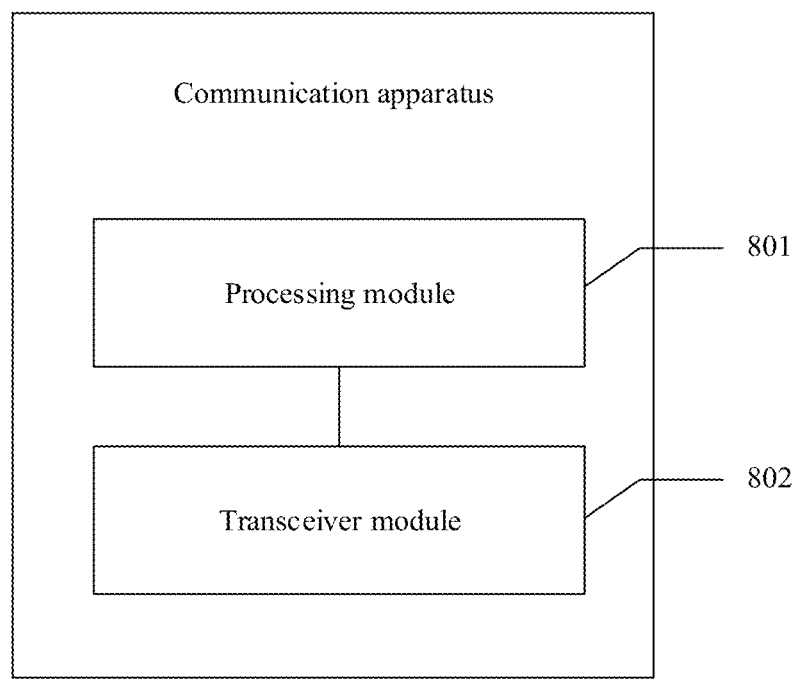
FIG. 8 is a schematic diagram of a structure of a communication apparatus according to an embodiment of this application.

Based on a same inventive concept as that of the method embodiments, an embodiment of this application provides a communication apparatus. A structure of the communication apparatus may be shown in FIG. 8, and includes a processing module 801 and a transceiver module 802.

In an implementation, the communication apparatus may be specifically configured to implement the method performed by the first apparatus in the embodiment in FIG. 5. The apparatus may be a communication device, or may be a chip, a chip set, or a part of a chip, where the chip and the chip set are in the communication device, and the part of the chip is configured to perform a function of a related method. A processing module 801 is configured to determine a QCL assumption of a first reference signal. The QCL assumption meets at least either of the following conditions: A plurality of periodic instances of the first reference signal at an interval of N periodicities have a same QCL assumption, where N is an integer greater than 0; and first reference signals that have different indexes and that are in a same resource set have different QCL assumptions. A transceiver module 802 is configured to receive based on the QCL assumption of the first reference signal, the first reference signal sent by a second apparatus.

In some embodiments, the QCL assumption meets: A plurality of periodic instances of the first reference signal at an interval of N periodicities have a same QCL assumption. Then when receiving based on the QCL assumption of the first reference signal, the first reference signal sent by a second apparatus, the transceiver module 802 may be specifically configured to receive the plurality of periodic instances by using a same receive beam or different receive beams.

Further, when receiving the plurality of periodic instances by using a same receive beam or different receive beams, the transceiver module 802 may be specifically configured to: if repetition of a resource set in which the first reference signal is located is configured to be OFF, receive the plurality of periodic instances by using different receive beams.

When receiving the plurality of periodic instances by using a same receive beam or different receive beams, the transceiver module 802 may be specifically configured to: if repetition of a resource set in which the first reference signal is located is configured to be ON, receive the plurality of periodic instances by using the same receive beam.

In some other embodiments, the QCL assumption meets that first reference signals that have different indexes and that are in a same resource set have different QCL assumptions. Then when receiving based on the QCL assumption of the first reference signal, the first reference signal sent by a second apparatus, the transceiver module 802 may be specifically configured to receive first reference signals that have different indexes and that are in a same resource set by using a same receive beam or different receive beams.

For example, N is a quantity of transmit beams of the second apparatus, or N is determined based on a quantity of transmit beams of the second apparatus and a quantity of first reference signals, or N is a quantity of receive beams of the first apparatus, or N is determined based on a quantity of receive beams of the first apparatus and a quantity of first reference signals.

In a possible implementation, the processing module 801 may be specifically configured to: if the QCL assumption is not configured for the first reference signal, use a QCL assumption of a second reference signal associated with the first reference signal as the QCL assumption of the first reference signal.

The transceiver module 802 may be further configured to: if no QCL assumption is configured for the second reference signal associated with the first reference signal, receive the second reference signal based on the QCL assumption of the first reference signal.

For example, the first reference signal is a CMR, and the second reference signal is an IMR. Alternatively, the first reference signal is an IMR, and the second reference signal is a CMR.

For example, no QCL assumption is configured for the first reference signal.

In an implementation, the communication apparatus may be specifically configured to implement the method performed by the second apparatus in the embodiment in FIG. 5. The apparatus may be a communication device, or may be a chip, a chip set, or a part of a chip, where the chip and the chip set are in the communication device, and the part of the chip is configured to perform a function of a related method. The processing module 801 is configured to determine a QCL assumption of a first reference signal, wherein the QCL assumption meets at least either of the following conditions: A plurality of periodic instances of the first reference signal at an interval of N periodicities have a same QCL assumption, wherein a periodic instance is the first reference signal sent in a periodicity, N is an integer greater than 0; and first reference signals that have different indexes and that are in a same resource set have different QCL assumptions. The transceiver module 802 is configured to send based on the QCL assumption of the first reference signal, the first reference signal to the first apparatus.

In some embodiments, the QCL assumption meets: A plurality of periodic instances of the first reference signal at an interval of N periodicities have a same QCL assumption. Then when sending based on the QCL assumption of the first reference signal, the first reference signal to the first apparatus, the transceiver module 802 may be specifically configured to send the plurality of periodic instances by using a same transmit beam or different transmit beams.

Further, when sending the plurality of periodic instances by using a same transmit beam or different transmit beams, the transceiver module 802 may be specifically configured to: if repetition of a resource set in which the first reference signal is located is configured to be OFF, send the plurality of periodic instances by using the same transmit beam.

When sending the plurality of periodic instances by using a same transmit beam or different transmit beams, the transceiver module 802 may be specifically configured to: if repetition of a resource set in which the first reference signal is located is configured to be ON, send the plurality of periodic instances by using the different transmit beams.

In some other embodiments, the QCL assumption meets that first reference signals that have different indexes and that are in a same resource set have different QCL assumptions. Then when sending based on the QCL assumption of the first reference signal, the first reference signal to the first apparatus, the transceiver module 802 is specifically configured to send first reference signals that have different indexes and that are in a same resource set by using a same transmit beam or different transmit beams.

For example, N is a quantity of transmit beams of the second apparatus, or N is determined based on a quantity of transmit beams of the second apparatus and a quantity of first reference signals, or N is a quantity of receive beams of the first apparatus, or N is determined based on a quantity of receive beams of the first apparatus and a quantity of first reference signals.

In a possible implementation, the processing module 801 may be specifically configured to: if the QCL assumption is not configured for the first reference signal, use a QCL assumption of a second reference signal associated with the first reference signal as the QCL assumption of the first reference signal.

The transceiver module 802 may be further configured to: if no QCL assumption is configured for the second reference signal associated with the first reference signal, send the second reference signal based on the QCL assumption of the first reference signal.

For example, the first reference signal is a channel measurement resource CMR, and the second reference signal is an interference measurement resource IMR. Alternatively, the first reference signal is an IMR, and the second reference signal is a CMR.

For example, no QCL assumption is configured for the first reference signal.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software function module. It may be understood that, for functions or implementations of the modules in embodiments of this application, further refer to related descriptions in the method embodiments.

Figure 9:
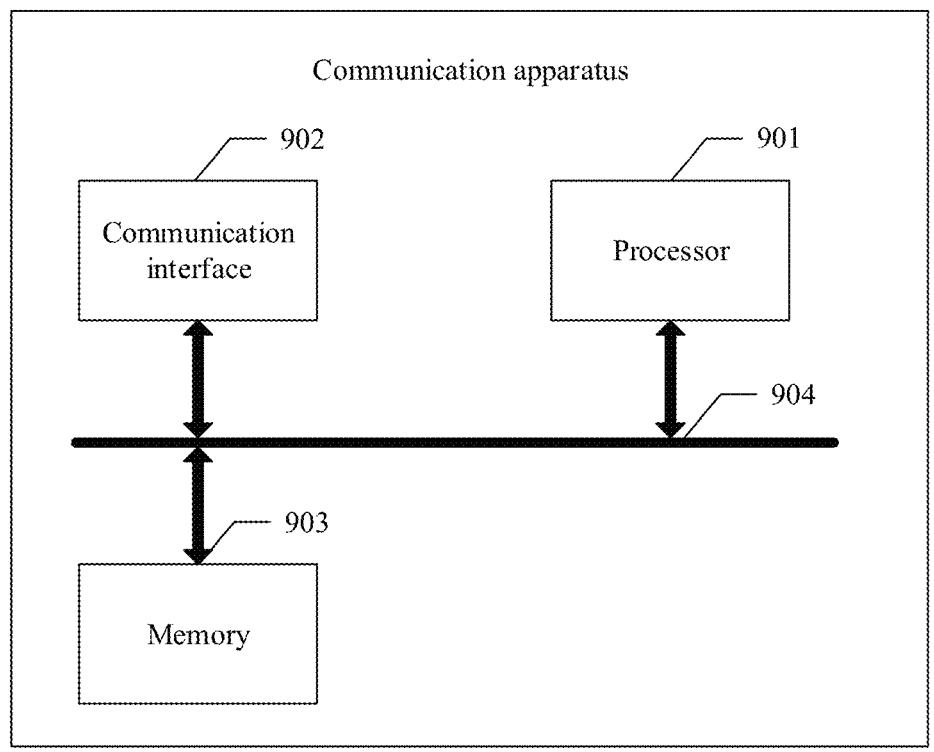
FIG. 9 is a schematic diagram of a structure of another communication apparatus according to an embodiment of this application.

In a possible manner, the communication apparatus may be shown in FIG. 9. The communication apparatus may be a communication device or a chip in the communication device. The communication device may be a terminal device, or may be a network device. The apparatus may include a processor 901, a communication interface 902, and a memory 903. The processing unit 801 may be the processor 901. The transceiver module 802 may be the communication interface 902.

The processor 901 may be a central processing module (CPU), a digital processing module, or the like. The communication interface 902 may be a transceiver, an interface circuit such as a transceiver circuit, a transceiver chip, or the like. The apparatus further includes the memory 903, configured to store a program executed by the processor 901. The memory 903 may be a nonvolatile memory, for example, a hard disk (HDD) or a solid-state drive (SSD), or may be a volatile memory, for example, a random access memory (RAM). The memory 903 is any other medium that can be configured to carry or store expected program code that has an instruction or a data structure form and that can be accessed by a computer, but is not limited thereto.

The processor 901 is configured to execute the program code stored in the memory 903, and is specifically configured to perform an action of the processing module 801. Details are not described herein in this application. The communication interface 902 is specifically configured to perform the actions of the transceiver module 802. Details are not described herein again in this application.

In this embodiment of this application, a specific connection medium between the communication interface 902, the processor 901, and the memory 903 is not limited. In this embodiment of this application, the memory 903, the processor 901, and the communication interface 902 are connected through a bus 904 in FIG. 9, and the bus is represented by a thick line in FIG. 9. A connection manner between other components is merely schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

An embodiment of the present invention further provides a computer-readable storage medium used to store computer software instructions that need to be executed by the processor. The computer software instructions include a program that needs to be executed by the processor.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the other programmable device, so that computer-implemented processing is generated. Therefore, the instructions executed on the computer or the other programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A beam training method, comprising:
   determining, by a first apparatus, a quasi co-location (QCL) assumption of a first reference signal, wherein the QCL assumption meets at least either of the following conditions: a plurality of periodic instances of the first reference signal at an interval of N periodicities have a same QCL assumption, wherein N is an integer greater than 0; and first reference signals that have different indexes and that are in a same resource set have different QCL assumptions; and
   receiving, by the first apparatus based on the QCL assumption of the first reference signal, the first reference signal sent by a second apparatus.

2. The method according to claim 1, wherein if the QCL assumption meets: a plurality of periodic instances of the first reference signal at an interval of N periodicities have a same QCL assumption,
   receiving, by the first apparatus based on the QCL assumption of the first reference signal, the first reference signal sent by the second apparatus comprises:
   receiving, by the first apparatus, the plurality of periodic instances by using a same receive beam or different receive beams.

3. The method according to claim 2, wherein receiving, by the first apparatus, the plurality of periodic instances by using the same receive beam or different receive beams comprises:
   if a repetition parameter of a resource set in which the first reference signal is located is configured to be an off state (OFF), receiving, by the first apparatus, the plurality of periodic instances by using different receive beams.

4. The method according to claim 2, wherein receiving, by the first apparatus, the plurality of periodic instances by using the same receive beam or different receive beams comprises:
   if a repetition parameter of a resource set in which the first reference signal is located is configured to be an on state (ON), receiving, by the first apparatus, the plurality of periodic instances by using the same receive beam.

5. The method according to claim 1, wherein if the QCL assumption meets that first reference signals that have different indexes and that are in a same resource set have different QCL assumptions,
   the receiving, by the first apparatus based on the QCL assumption of the first reference signal, the first reference signal sent by the second apparatus comprises:
   receiving, by the first apparatus, the first reference signals that have different indexes and that are in the same resource set by using a same receive beam or different receive beams.

6. The method according to claim 1, wherein N is a quantity of transmit beams of the second apparatus, or N is determined based on the quantity of transmit beams of the second apparatus and a quantity of first reference signals, or N is a quantity of receive beams of the first apparatus, or N is determined based on the quantity of receive beams of the first apparatus and the quantity of first reference signals.

7. A beam training apparatus, comprising: at least one processor, and one or more memories coupled to the at least one processor and storing programming instructions for execution by the at least one processor to perform operations comprising:
   determining a quasi co-location (QCL) assumption of a first reference signal, wherein the QCL assumption meets at least either of the following conditions: a plurality of periodic instances of the first reference signal at an interval of N periodicities have a same QCL assumption, wherein N is an integer greater than 0; and first reference signals that have different indexes and that are in a same resource set have different QCL assumptions; and
   receiving based on the QCL assumption of the first reference signal, the first reference signal sent by a second apparatus.

8. The apparatus according to claim 7, wherein if the QCL assumption meets: a plurality of periodic instances of the first reference signal at an interval of N periodicities have a same QCL assumption,
   when receiving based on the QCL assumption of the first reference signal, the first reference signal sent by the second apparatus, the operations comprise:
   receiving the plurality of periodic instances by using a same receive beam or different receive beams.

9. The apparatus according to claim 8, wherein when receiving the plurality of periodic instances by using the same receive beam or different receive beams, the operations comprise:
   if a repetition parameter of a resource set in which the first reference signal is located is configured to be an off state (OFF), receiving the plurality of periodic instances by using different receive beams.

10. The apparatus according to claim 8, wherein when receiving the plurality of periodic instances by using the same receive beam or different receive beams, the operations comprise:
    if a repetition parameter of a resource set in which the first reference signal is located is configured to be an on state (ON), receiving the plurality of periodic instances by using the same receive beam.

11. The apparatus according to claim 7, wherein if the QCL assumption meets that first reference signals that have different indexes and that are in the same resource set have different QCL assumptions,
   when receiving based on the QCL assumption of the first reference signal, the first reference signal sent by a second apparatus, the operations comprise:
   receiving the first reference signals that have different indexes and that are in the same resource set by using a same receive beam or different receive beams.

12. The apparatus according to claim 7, wherein N is a quantity of transmit beams of the second apparatus, or N is determined based on the quantity of transmit beams of the second apparatus and a quantity of first reference signals, or N is a quantity of receive beams of the first apparatus, or N is determined based on the quantity of receive beams of the first apparatus and the quantity of first reference signals.

13. The apparatus according to claim 7, wherein the operations comprise:
   if the QCL assumption is not configured for the first reference signal, using a QCL assumption of the second reference signal associated with the first reference signal as the QCL assumption of the first reference signal.

14. A beam training apparatus, comprising: at least one processor, and one or more memories coupled to the at least one processor and storing programming instructions for execution by the at least one processor to perform operations comprising:
   determining a quasi co-location (QCL) assumption of a first reference signal, wherein the QCL assumption meets at least either of the following conditions: a plurality of periodic instances of the first reference signal at an interval of N periodicities have a same QCL assumption, wherein the periodic instance is the first reference signal sent in a periodicity, and N is an integer greater than 0; and first reference signals that have different indexes and that are in a same resource set have different QCL assumptions; and
   sending based on the QCL assumption of the first reference signal, the first reference signal to a first apparatus.

15. The apparatus according to claim 14, wherein if the QCL assumption meets: a plurality of periodic instances of the first reference signal at an interval of N periodicities have a same QCL assumption,
   when sending based on the QCL assumption of the first reference signal, the first reference signal to the first apparatus, the operations comprise:
   sending the plurality of periodic instances by using a same transmit beam or different transmit beams.

16. The apparatus according to claim 15, wherein when sending the plurality of periodic instances by using the same receive beam or different transmit beams, the operations comprise:
   if a repetition parameter of a resource set in which the first reference signal is located is configured to be an off state (OFF), sending the plurality of periodic instances by using the same transmit beam.

17. The apparatus according to claim 15, wherein when sending the plurality of periodic instances by using the same receive beam or different transmit beams, the operations comprise:
   if a repetition parameter of a resource set in which the first reference signal is located is configured to be an on state (ON), sending the plurality of periodic instances by using the different transmit beams.

18. The apparatus according to claim 14, wherein if the QCL assumption meets that first reference signals that have different indexes and that are in the same resource set have different QCL assumptions,
   when sending based on the QCL assumption of the first reference signal, the first reference signal to the first apparatus, the operations comprise:
   sending the first reference signals that have different indexes and that are in the same resource set by using a same transmit beam or different transmit beams.

19. The apparatus according to claim 14, wherein N is a quantity of transmit beams of the second apparatus, or N is determined based on the quantity of transmit beams of the second apparatus and a quantity of first reference signals, or N is a quantity of receive beams of the first apparatus, or N is determined based on the quantity of receive beams of the first apparatus and the quantity of first reference signals.

20. The apparatus according to claim 14, wherein the operations comprise:
   if the QCL assumption is not configured for the first reference signal, using a QCL assumption of the second reference signal associated with the first reference signal as the QCL assumption of the first reference signal.

* * * * *

UNITED STATES PATENT AND TRADEMARK OFFICE
CERTIFICATE OF CORRECTION

| | | |
|---|---|---|
| PATENT NO. | : 11,990,977 B1 | Page 1 of 1 |
| APPLICATION NO. | : 17/960939 | |
| DATED | : May 21, 2024 | |
| INVENTOR(S) | : Tie Li et al. | |

It is certified that error appears in the above-identified patent and that said Letters Patent is hereby corrected as shown below:

On the Title Page

In item (57), in Column 2, in "Abstract", Line 3, delete "includes: The" and insert -- includes: the --.

In item (57), in Column 2, in "Abstract", Line 8, delete "conditions: A" and insert -- conditions: a --.

In the Claims

In Column 30, Line 10, in Claim 5, before "receiving," delete "the".

Signed and Sealed this
Thirty-first Day of December, 2024

Derrick Brent
*Acting Director of the United States Patent and Trademark Office*